(12) United States Patent  
Berg et al.

(10) Patent No.: US 7,369,716 B2
(45) Date of Patent: May 6, 2008

(54) HIGH PRESSURE AND HIGH TEMPERATURE ACOUSTIC SENSOR

(75) Inventors: Arne Berg, Kattem (NO); Sverre Knudsen, Trondheim (NO); Geir Bjarte Havsgard, Trondheim (NO); Daniel Ming Kwong Woo, Missouri City, TX (US); James Dunphy, South Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 388 days.

(21) Appl. No.: 10/796,569

(22) Filed: Mar. 9, 2004

(65) Prior Publication Data

US 2004/0202401 A1 Oct. 14, 2004

Related U.S. Application Data

(63) Continuation-in-part of application No. 10/266,903, filed on Oct. 6, 2002, now Pat. No. 6,888,972.

(51) Int. Cl.
G02B 6/00 (2006.01)
(52) U.S. Cl. .......................................... 385/12; 385/13
(58) Field of Classification Search ..................... None
See application file for complete search history.

(56) References Cited

U.S. PATENT DOCUMENTS

| | | | |
|---|---|---|---|
| 4,775,009 A | 10/1988 | Wittrisch et al. | |
| 4,870,269 A | 9/1989 | Jeunhomme et al. | |
| 4,986,350 A | 1/1991 | Czernichow | |
| 5,181,565 A | 1/1993 | Czernichow | |
| 5,209,118 A | * | 5/1993 | Jerman .......................... 73/715 |
| 5,243,562 A | 9/1993 | Laurent et al. | |

(Continued)

FOREIGN PATENT DOCUMENTS

| | | |
|---|---|---|
| GB | 2355740 | 2/2001 |
| WO | WO 02/04984 | 1/2002 |

OTHER PUBLICATIONS

Mendez et al., "Micromachined Fabry-Perot Interferometer with corrugated silicon diaphragm for fiber optic sensing applications", Proceedings of SPIE-The International Society for Optical Engineering, vol. 1793, pp. 170-182, 1993.*

(Continued)

*Primary Examiner*—Sung Pak
(74) *Attorney, Agent, or Firm*—Patterson & Sheridan, L.L.P.

(57) ABSTRACT

An acoustic sensor, such as a hydrophone, is deployable in a fluidic media having high temperature, high pressure, and/or potentially caustic chemicals. The hydrophone includes a housing filled with an internal fluid and containing a sensing mandrel. The sensing mandrel senses the acoustic pressure transmitted to the internal fluid through a diaphragm. The sensing mandrel preferably includes a polymer tubular mandrel having a coil of optical fiber wound and bonded to its outer surface. The sensing mandrel can be suspended within the housing instead of being rigidly attached thereto. To relieve pressure created by thermal expansion of the internal fluid, the flexible diaphragm, a filler member, a pressure compensator, or combinations thereof can be used. The filler member is mounted in the hydrophone and reduces the amount of internal fluid required in the housing. The compensator may be a bellows or a buffer tube.

6 Claims, 10 Drawing Sheets

U.S. PATENT DOCUMENTS

| | | |
|---|---|---|
| 5,303,773 A | 4/1994 | Czernichow et al. |
| 5,355,952 A | 10/1994 | Meynier |
| 5,361,130 A | 11/1994 | Kersey et al. |
| 5,401,956 A | 3/1995 | Dunphy et al. |
| 5,493,390 A | 2/1996 | Varasi et al. |
| 5,503,225 A | 4/1996 | Withers |
| 5,524,709 A | 6/1996 | Withers |
| 5,767,411 A | 6/1998 | Maron |
| 5,860,483 A | 1/1999 | Havig |
| 5,892,733 A | 4/1999 | Havig |
| 5,892,860 A * | 4/1999 | Maron et al. ............... 385/12 |
| 5,925,879 A | 7/1999 | Hay |
| 5,926,437 A | 7/1999 | Ortiz |
| 6,009,216 A | 12/1999 | Pruett et al. |
| 6,016,702 A | 1/2000 | Maron |
| 6,049,508 A | 4/2000 | Deflandre |
| 6,072,567 A | 6/2000 | Sapack |
| 6,151,437 A | 11/2000 | Cherbettchian et al. |
| 6,218,661 B1 * | 4/2001 | Schroeder et al. ..... 250/227.14 |
| 6,233,374 B1 * | 5/2001 | Ogle et al. .................... 385/13 |
| 6,246,048 B1 * | 6/2001 | Ramos et al. .......... 250/227.18 |
| 6,269,198 B1 | 7/2001 | Hodgson et al. |
| 6,278,811 B1 * | 8/2001 | Hay et al. ..................... 385/13 |
| 6,278,823 B1 | 8/2001 | Goldner et al. |
| 6,295,394 B1 | 9/2001 | Arab-Sadeghabadi |
| 6,351,987 B1 * | 3/2002 | Winston et al. ............ 73/53.01 |
| 6,385,122 B1 | 5/2002 | Chang |
| 6,404,961 B1 | 6/2002 | Bonja et al. |
| 6,442,304 B1 | 8/2002 | Crawley et al. |
| 6,549,488 B2 * | 4/2003 | Maas et al. ................. 367/149 |
| 6,575,033 B1 | 6/2003 | Knudsen et al. |
| 6,706,348 B2 * | 3/2004 | Quigley et al. ............ 428/36.3 |
| 6,882,595 B2 * | 4/2005 | Woo ........................... 367/149 |
| 6,888,972 B2 * | 5/2005 | Berg et al. ..................... 385/12 |

OTHER PUBLICATIONS

GB Examination Report, Application No. GB 0323334.3, dated Jun. 21, 2005.

* cited by examiner

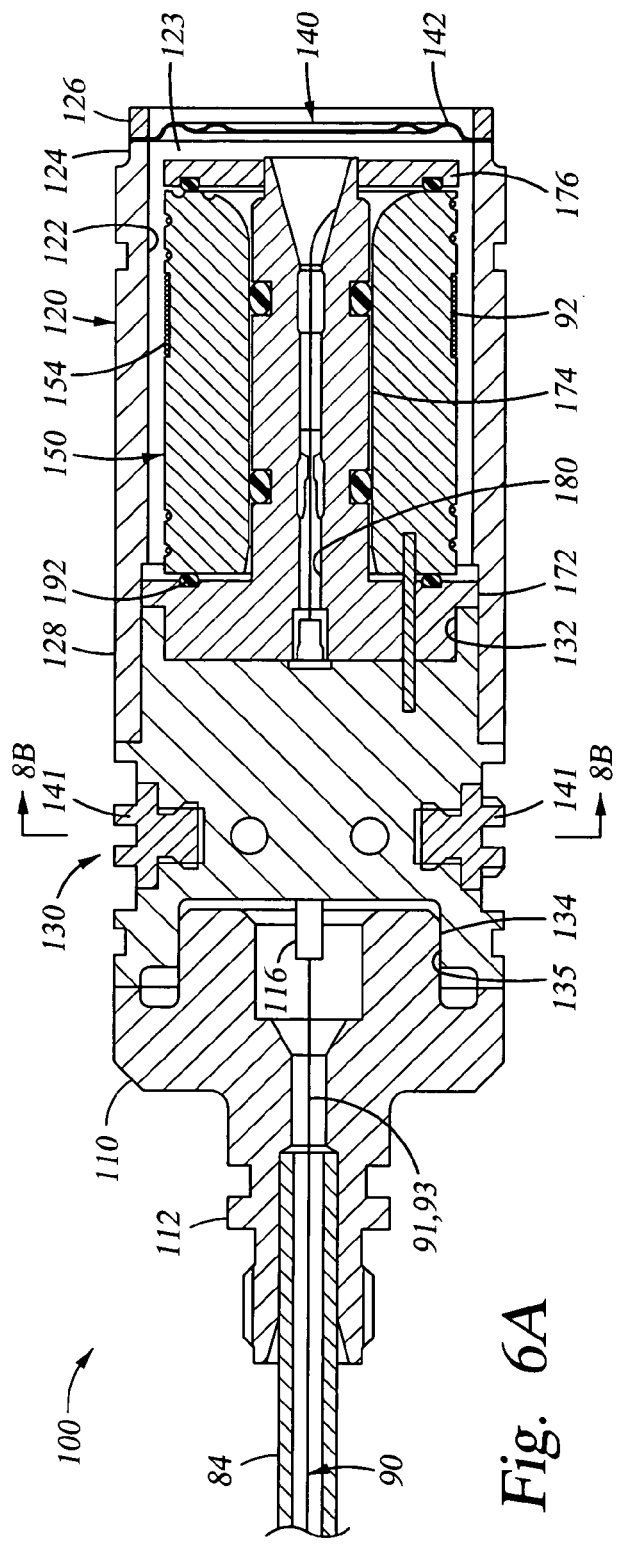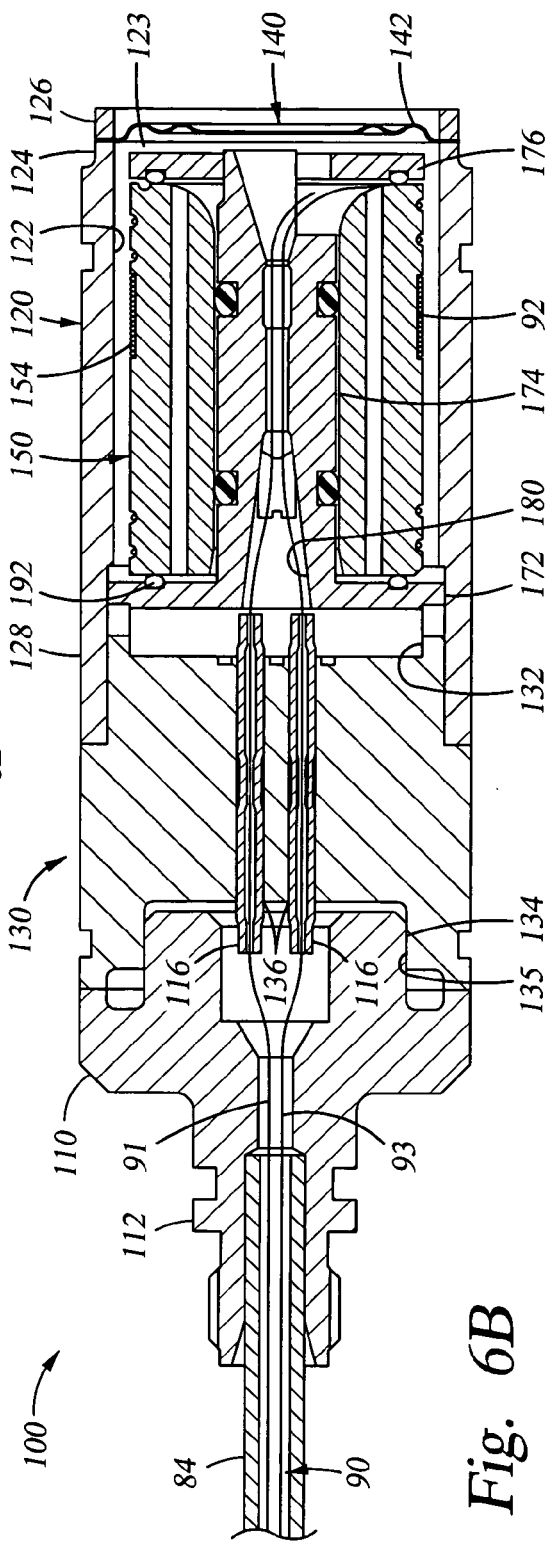
Fig. 6A
Fig. 6B

HIGH PRESSURE AND HIGH TEMPERATURE ACOUSTIC SENSOR

CROSS-REFERENCE TO RELATED APPLICATIONS

This application is a continuation-in-part of U.S. patent application Ser. No. 10/266,903, filed Oct. 6, 2002 now U.S. Pat. No. 6,888,972 and entitled "Multiple Component Sensor Mechanism," (hereinafter the '903 application) to which priority is claimed and which is incorporated herein by reference in its entirety.

BACKGROUND OF THE INVENTION

1. Field of the Invention

The present invention relates generally to a sensor for use in high pressure and high temperature applications, such as in an oil/gas well, and more particularly to a fiber optic based hydrophone.

2. Description of the Related Art

Fiber optic based acoustic sensors, such as hydrophones, are known in the art for use in a number of applications involving the sensing of acoustic pressures in fluidic media (i.e., gas or liquid). Examples of prior art hydrophones are disclosed in the following U.S. patents which are hereby incorporated by reference in their entireties: U.S. Pat. Nos. 5,625,724; 5,317,544; 5,668,779; 5,363,342; and 5,394,377. A review of these references reveals the general structure of a fiber optic based hydrophone, which constitutes a winding of optical fiber or a fiber Bragg grating (FBG) wrapped around a compliant cylindrical mandrel. As is well known, when acoustic pressures in the fluidic media being measured impinge upon the mandrel, the mandrel will deform, thus perturbing the optical fiber. Optical detection of the change of the winding (e.g., by the use interferometric techniques), or optical detection of the Bragg reflection wavelength shift of the FBG, allows the impingent pressure to be quantified.

However, most prior art hydrophones are believed to be unsuitable for deployment in extremely harsh environments, such as those present within an oil or gas well. As one skilled in the art will understand, the downhole environment of an oil/gas well is characterized by extremely high pressures (e.g., 15 k psi) and temperatures (e.g., 150-250 Centigrade). Furthermore, the downhole environment also potentially contains caustic chemicals and bits of debris. The design of the above-referenced hydrophones would likely be damaged by deployment down an oil/gas well, as they disclose designs that would either collapse under the extreme pressures of the downhole environment, would be degraded by the high temperatures and chemicals that exist downhole, or would be damaged by debris that could potentially contact the exposed delicate windings of fiber optic cable present in some of these designs. Additionally, as some of these prior art designs rely on the use of non-compliant reference windings to supplement the compliant measurement windings, the extreme pressures present downhole could affect the reference windings, thus rendering the referencing scheme unreliable for downhole use. Furthermore, at least some of these designs are not suitably small in size for deployment down the well, e.g., within the annulus of the well between the production pipe and the well casing cemented to the borehole of the well.

Therefore, a need exists in the art for an acoustic sensor and more specifically a fiber optic based hydrophone that is relatively small and is capable of operating at high temperatures and/or pressures, and that is not susceptible to caustic downhole chemicals.

(For further reference concerning hydrophone technology, the reader is referred to the following U.S. patent applications, which are incorporated herein by reference: Ser. No. 10/348,445, filed Jan. 21, 2003, and Ser. No. 10/393,170, filed Mar. 20, 2003).

SUMMARY OF THE INVENTION

An acoustic sensor, such as a hydrophone, is disclosed that is deployable in a fluidic media having high temperature, high pressure, and/or potentially caustic chemicals. The hydrophone includes a housing having a diaphragm and a sensing mandrel. The housing is filled with an internal fluid, and the diaphragm separates the internal fluid in the housing from the fluidic media. The sensing mandrel senses the acoustic pressure transmitted to the internal fluid through the diaphragm. The sensing mandrel is preferably tubular and composed of a polymer having a coil of optical fiber wound and bonded to its outer surface.

Several aspects for mounting the sensing mandrel in the housing are disclosed. In one aspect, a plurality of pins couples an end of the sensing mandrel to the inside of the housing. In another aspect, an inner bore of the tubular sensing mandrel is mounted on an axle coupled to the housing. O-rings are positioned between the sensing mandrel, the axle, and the housing to "suspend" the sensing mandrel in the housing.

Several aspects for routing and organizing the fiber optic cable in the hydrophone are disclosed. In one aspect, for example, the sensing mandrel has a helical groove for routing the fiber optic cable on an outer surface of the mandrel. In another aspect, the sensing mandrel has a spiral groove for routing the fiber optic cable on an end face of the mandrel. In yet another aspect, the sensing mandrel has a tunnel for routing the fiber optic cable through the mandrel from one end face to the other end face. In a further aspect, the sensing mandrel has recesses for protecting fiber Bragg gratings from sensing strain directly. Several aspects for operating the hydrophone under high pressure, high temperature, and potentially caustic environments are disclosed. In one aspect, the flexible diaphragm is deformable to relieve pressure created by thermal expansion of the internal fluid within the hydrophone. In another aspect, for example, a filler member is mounted in the hydrophone to reduce the amount of internal fluid required in the housing. In yet another aspect, a pressure compensator is positioned within the housing to relieve pressure created by thermal expansion of the internal fluid in the housing. The compensator can be a bellows composed of metal or a buffer tube. Thus, the compensator may have an interior communicating with the fluidic media being monitored by a conduit in the housing. The disclosed aspects for operating the hydrophone under high pressure, high temperature, and potentially caustic environments can be combined.

The foregoing summary is not intended to summarize each potential embodiment or every aspect of the present disclosure.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-B illustrate orthogonal cross-sections of the hydrophone of FIG. 5.

DETAILED DESCRIPTION OF THE PREFERRED EMBODIMENT

In the interest of clarity, not all of the written description and figures of U.S. patent application Ser. No. 10/266,903 (the '903 application), to which the present disclosure is a continuation-in-part, are provided in the present disclosure. Furthermore, not all features of actual implementations of an acoustic sensor are described in the disclosure that follows. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of an acoustic sensor would nevertheless be a routine undertaking for those skilled in the art given the details provided by this disclosure.

I. First Hydrophone Embodiment

A. Basic Structure and Assembly

Referring to FIGS. 1-3B, an embodiment of an acoustic sensor 10 is illustrated. In the present embodiment, the acoustic sensor 10 is an optical fiber based hydrophone. In a preferred embodiment, the hydrophone 10 is preferably small enough in size to fit into the annulus of an oil/gas well. In one embodiment, the outer diameter of the hydrophone 10 can be about 1-inch or 25-mm, and the hydrophone 10 can have an overall length of about 2-inches or 50-mm. As best shown in the side view of FIG. 1, O-rings 12 and 14 preferably composed of an elastomeric material suitable for the intended environment of the hydrophone 10 are disposed about the outside of the hydrophone 10 for decoupling the hydrophone 10 from a device used to hold it in the annulus. For example, the hydrophone 10 can be held within a recess of an in-well seismic clamp, such as is disclosed in U.S. Provisional Patent Application Ser. No. 60/416,932, filed Oct. 6, 2002 and entitled "Clamp Mechanism for In-well Seismic Station," which is incorporated herein by reference in its entirety. As one of ordinary skill in the art will realize, however, the hydrophone 10 may be deployed down a well in many different ways and may be coupled to many different structures found in a producing well. The hydrophone 10 may also be uncoupled and essentially left free floating within the well, although this is not preferred as this may make the hydrophone 10 susceptible to damage or may cause the well to become obstructed.

Figure 1:
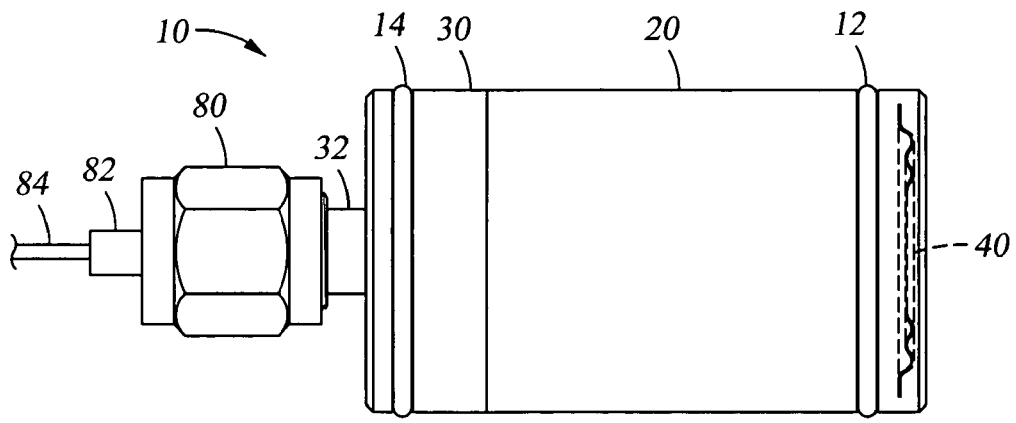
FIG. 1 illustrates a side view of a first embodiment of a hydrophone.
Figure 2:
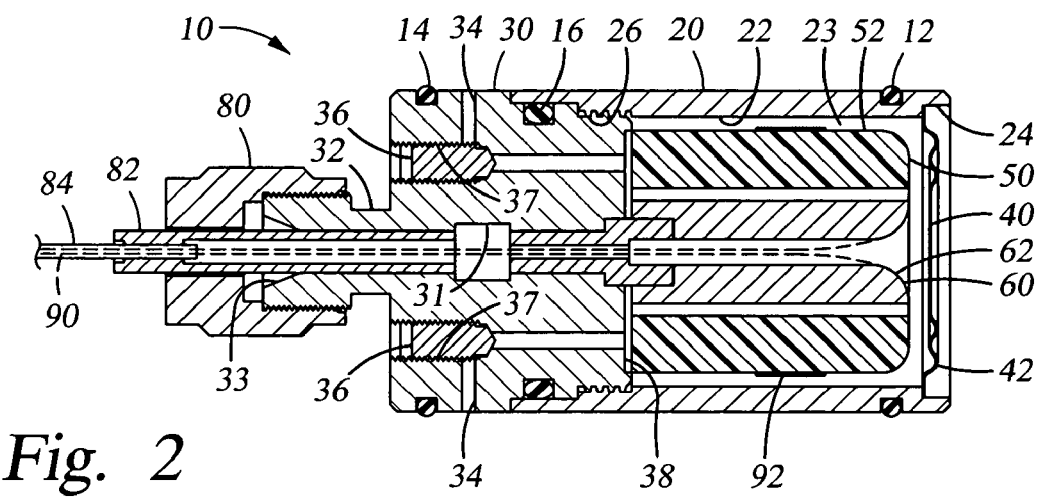
FIG. 2 illustrates a cross-section of the hydrophone of FIG. 1.
Figure 3:
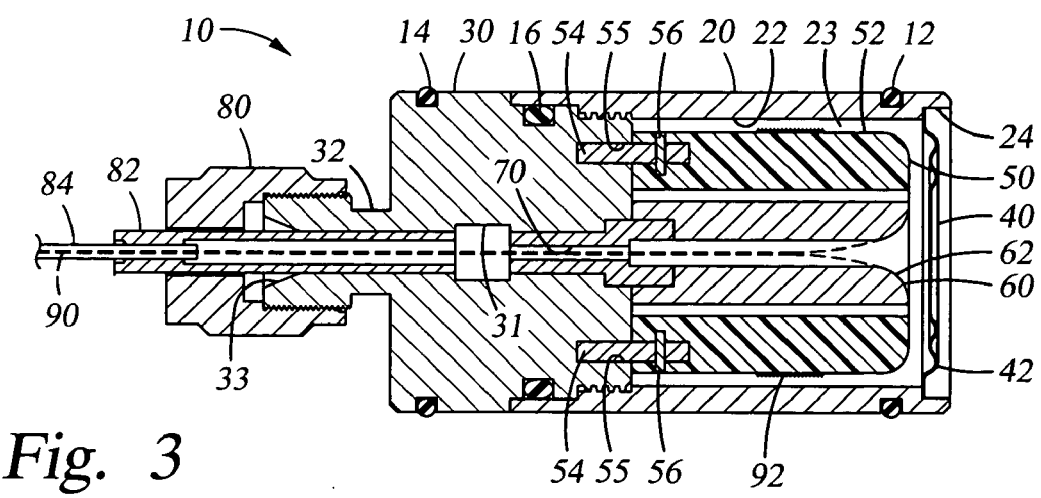
FIG. 3 illustrates an orthogonal cross-section of the hydrophone of FIG. 1.

As best shown in the cross-sections of FIGS. 2-3, the hydrophone 10 includes a tubular housing 20, an end cap 30, a flexible diaphragm 40, a sensing mandrel 50, and a filler member 60. The end cap 30 is attached to one end 26 of the tubular housing 20, and the flexible diaphragm 40 is attached to another end 24 of the tubular housing 20. The sensing mandrel 50 and filler member 60 are housed in a chamber 23 formed within the hydrophone 10. The hydrophone 10 is designed for applications in which it will be placed in the well fluids within the annulus of a well, and therefore will be exposed to high static pressures, high temperatures, and potentially caustic chemicals. Accordingly, the housing 20 and end cap 30 are preferably composed of stainless steel (e.g., ASTM UNS S17400), INCONEL, or other material suitable for the environment to be encountered. In addition, the flexible diaphragm 40 is preferably composed of stainless steel or other suitable material for the intended environment.

The end cap 30 can be attached to the housing 20 using a number of methods or techniques known in the art. In one embodiment, the end cap 30 and the housing 20 can thread together in a screw-type relationship with an O-ring 16 used to seal their connection. Alternatively, the end cap 30 can be attached to the housing 20 by welding. A number of suitable welding techniques known in the art can be used for attaching the end cap 30 to the housing 20, such as tungsten-inert-gas (TIG) welding or Electron Beam (EB) welding. Because the conditions in the annulus of a well can be deleterious to fiber optic components, such as the sensing mandrel 50 and associated fiber optic winding 92, such components are not directly exposed to the fluidic media being monitored in the disclosed embodiment. Instead, the sensing mandrel 50 is acoustically coupled to the fluidic media being measured by the flexible diaphragm 40 and an internal fluid contained within the chamber 23, both of which transmit acoustic pressure from the fluidic media to the fiber optic based sensing mandrel 50. Therefore, the housing 20, end cap 30, and diaphragm 40 protect the optical fiber in the hydrophone 10 and its associated winding 92 on the sensing mandrel 50 from direct contact with the fluidic media being measured.

The flexible diaphragm 40 attached to the end 24 of the tubular housing 20 encloses the inner chamber 23. Preferably, the end 24 of the tubular housing 20 defines a recessed shoulder where the flexible diaphragm 40 is attached, which can protect the diaphragm 40 from damage. When the hydrophone 10 is assembled and filled with an internal fluid as will be explained later, the diaphragm 40 transfers acoustic signals from outside the hydrophone 10 to the sensing mandrel 50 housed within the chamber 23. To transfer the acoustic signals without substantial damping, the diaphragm 40 is preferably thin and flexible. To facilitate bending in response to an acoustic signal, the flexible diaphragm 40 preferably defines a plurality of circumferential ridges 42. The thickness of the diaphragm 40 depends on a number of variables, including the expected temperature and pressure in the intended environment as well as the desired acoustic sensitivity. In a preferred embodiment, the diaphragm 40 is approximately 2 to 4 mil (0.05 to 0.1-mm) thick and composed of stainless steel. Because the flexible diaphragm 40 is relatively thin, a laser weld is preferred to attach the diaphragm 40 to end 24, but this is not strictly necessary as other techniques such as EB welding can be used.

The end cap 30 has a threaded extension 32 defining an opening 33 for attaching to a capillary tube or cable 84 from a splice housing, fiber organizer, other sensor, or the like. As best shown in FIGS. 2-3, a tubular extension 82 is attached to the end of the capillary tube 84 by brazing. The tubular extension 82 is then inserted into the opening 33 in the threaded extension 32, and a locking or gyro nut 80 threads onto the threaded extension 32 of the end cap 30. As the locking nut 80 is screwed on the threaded extension 32, the opening 33 is further enclosed on the tubular extension 82 to hold it with a compression fit.

A passage 31 defined in the end cap 30 is connected with the opening 33 in the threaded extension 32, and an optical feedthrough 70 is installed in the passage 31. The optical feedthrough 70 communicates optical fiber 90 between the capillary tube 84 and the sensing mandrel 50 in the chamber 23. Because the interior of the chamber 23 will be subject to high pressures, the interface between the capillary tube 84 and the hydrophone chamber 23 requires a high-pressure barrier. To effectuate this, the optical feedthrough 70 is typically sealed by an epoxy or other sealant known in the art after the optical fiber 90 has been positioned through the feedthrough 70. Suitable optical fiber feedthrough schemes are disclosed in U.S. Pat. Nos. 6,445,868 and 6,526,212, which are both incorporated herein by reference.

Figure 3A:
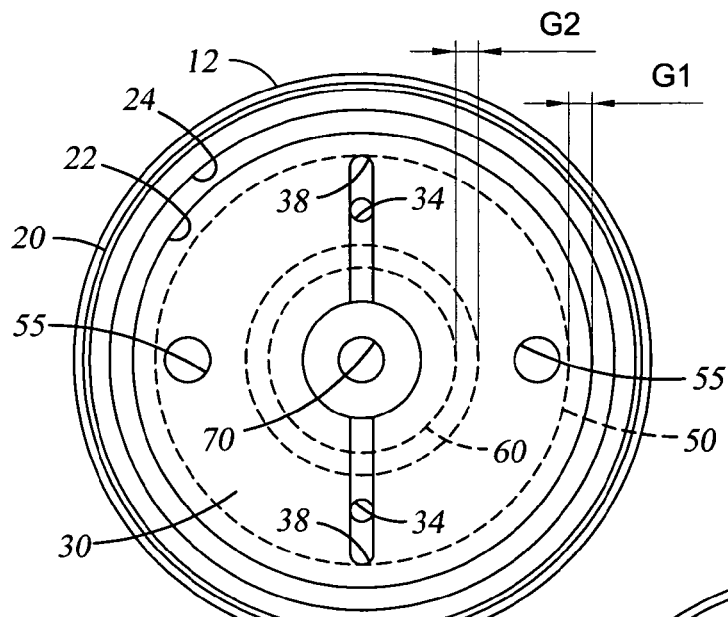
FIG. 3A illustrates an exposed end view of the hydrophone of FIG. 1.
Figure 3B:
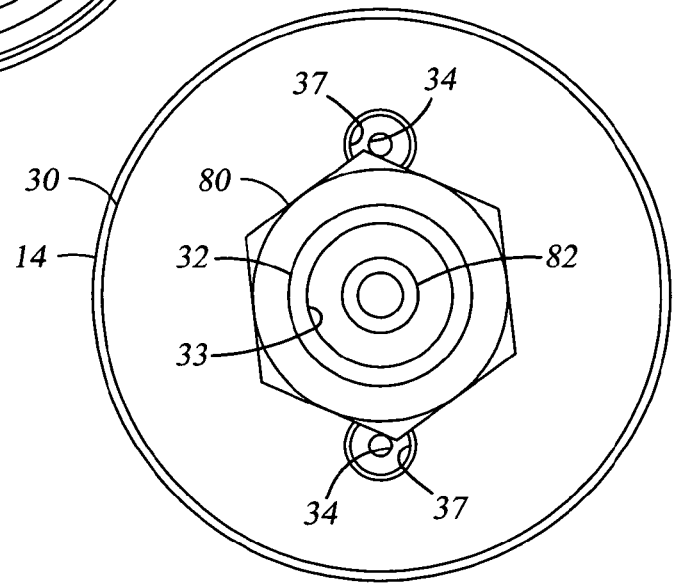
FIG. 3B illustrates another end view of the hydrophone of FIG. 1.

For filling the chamber 23 with an internal fluid, the end cap 30 defines one or more filling ports 34, as best shown in FIG. 2. The internal fluid is preferably almost incompressible and can be silicon or oil, for example. A screw 36 is used to plug off the filling port 34 after filling. The screw 36 has a conical end and threads into a threaded opening 37 that intersects and cuts off the filling port 34. It is preferred to have two filling ports 34 and screws 36 as shown so that one pair can be used as a vent when the other pair is used to introduce the internal fluid into the chamber 23. As best shown in FIG. 3A, which illustrates the internal structure of the end cap 30 from the vantage point of end 24, and with the diaphragm 40, sensing mandrel 50 and filler member 60 removed for clarity; the filling ports 34 preferably have channels 38 defined in the end cap 30. Because the sensing mandrel 50 and filler member 60 attach to the end cap 30 as described below, a gap G1 is formed between sensing mandrel 50 and filler member 60, and a gap G2 is formed between the sensing mandrel 50 and the housing 20. The channels 38 communicate with the gap G2 between the sensing mandrel 50 and filler member 60 for filling the assembled hydrophone 10 with the internal fluid. As one skilled in the art will appreciate, care should be taken to render the internal fluid in the chamber 23 free of voids, such as compressible or expandable air bubbles, which can damage the diaphragm 40 or can hinder operation of the hydrophone 10. Accordingly, the chamber 23 is filled with the internal fluid using appropriate procedures known in the art.

Referring again to FIG. 3, the sensing mandrel 50 is mounted in the housing 20 using first pins 54 that mount into bores 55 formed in the end cap 30 and in the sensing mandrel 50. (The bores 55 in the end cap 30 are best shown in the end view of FIG. 3A.) The first pins 54 can be press fit, epoxied, screwed, tack welded or held by another technique in the bores 55. To hold the sensing mandrel 50 on the first pins 54, second pins 56 are positioned through the sensing mandrel 50 and the first pins 54 and can be held by epoxy or the like. When using the pins 54 and 56 to hold the sensing mandrel 50 in the hydrophone 10, attention must be paid to manufacturing tolerances of the pins 54 and 56 and the bores in the end cap 30 and sensing mandrel 50 so that the acoustic response of the sensing mandrel 50 is not compromised.

The sensing mandrel 50 in the chamber 23 as noted earlier includes a coil 92 of optical fiber 90 wound around and bonded to an outer surface 52 of the sensing mandrel 50. The sensing mandrel 50 is preferably cylindrical and composed of any of several well-known polymers that can withstand high temperatures and pressures, such as Teflon™ (polytetrafluoroethylene), Torlon™ 4203L (polyamide-imide), or PEEK 450G (polyetheretherketone) or other similar materials. The sensing mandrel's inside diameter also forms a tunnel for the routing of ingress and egress optical fiber 90 as shown. Because the hydrophone 10 is intended to fit in the annulus of the well, the dimensions of the housing 20 and other components of the hydrophone 10 partly dictate the space available for and the size of the sensing mandrel 50 and other internal components. In general, the outer diameter of sensing mandrel 50 can be from about 13 to 18-mm, and the inner diameter can be from about 5 to 12-mm. The length of the sensing mandrel 50 can be from about 20 to 50-mm. Preferably, the sensing mandrel 50 has a rounded edge near the diaphragm 40 for smooth routing of the optical fiber 90 between the feedthrough 70 and the outer surface 52 of the sensing mandrel 50.

When deployed in high temperatures, the internal fluid within the chamber 23 of the hydrophone 10 will thermally expand, which increases the pressure in the chamber 23 and raises a concern that the diaphragm 40 could be damaged. The diaphragm 40 is preferably thick enough to (at least partially) accommodate for this increased internal pressure, yet at the same time be thin enough to transfer acoustic signals without substantially damping those signals. To reduce the deleterious effects of thermally expanding fluid on the diaphragm 40 while still maintaining a thin and resilient diaphragm 40, the disclosed hydrophone 10 in the present embodiment includes a filler member 60, which reduces the volume of internal fluid required within the chamber 23. The filler member 60 is preferably composed of the same material as the housing components of the housing 20 and end cap 30, although this is not strictly necessary. For example, if the housing components 20 and 30 are composed of INCONEL because they will be exposed to a caustic environment, the filler member 60 can be merely composed of stainless steel because it will not encounter that environment.

The filler member 60 is preferably tubular and is positioned within the internal bore of the sensing mandrel 50. One end of the filler member 60 is attached to the end cap 30 using techniques known in the art that can withstand the high pressures, high temperatures, and any shocks that may be encountered. For example, the filler member 60 can be threaded, press fit, welded, or epoxied onto an end of the feedthrough 70 and/or the end cap 30. The other end of the filler member 60 is preferably rounded, similarly to the sensing mandrel 50, to smoothly pass the optical fiber 90 between the feedthrough 70 and sensing mandrel 50. As noted, the space taken up by the filler member 60 within the chamber 23 reduces the necessary volume of internal fluid required to fill the chamber 23, thereby reducing pressure caused by thermal expansion of the internal fluid within the chamber 23. Of course, use of a filler member is not strictly necessary. The filler member 60 (and/or the mandrel 50) forms a passageway or tunnel to allow ingress and egress optical fibers 90 to enter and exit the chamber 23.

Under ambient conditions, the chamber 23 of the hydrophone 10 with the sensing mandrel 50 and the filler member 60 mounted therein will hold a known amount of the internal fluid. Knowing the volume of internal fluid in the chamber 23, its coefficient of thermal expansion, and the temperatures and pressures of the intended environment, the potential increase in pressure exerted by the thermal expansion of the internal fluid within the chamber 23 can be estimated, which provides the hydrophone designer some indication of how resilient the diaphragm 40 must be for a given operational environment.

B. Exemplary Optical Circuit for the Hydrophone

Figure 4:
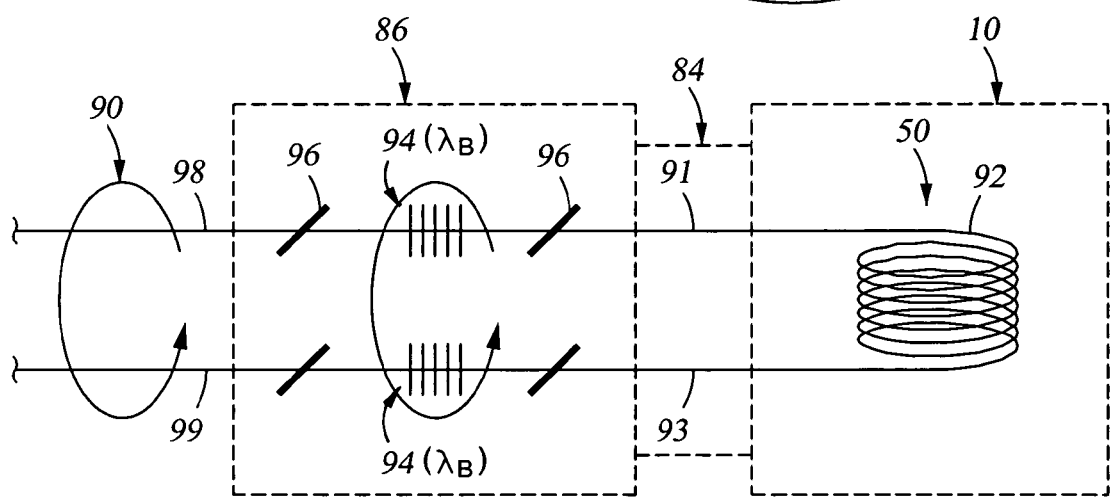
FIG. 4 illustrates an exemplary optical circuit for the hydrophone of FIG. 1.

An exemplary optical circuit for the hydrophone 10 of FIGS. 1-3B is diagrammatically shown in FIG. 4. As noted above, the optical circuit of the hydrophone 10 preferably includes a sensing coil 92 of fiber optic cable 90 wrapped around the sensing mandrel 50 as schematically shown. The sensing coil 92 is bounded by a pair of fiber Bragg gratings 94 preferably having the same Bragg reflection wavelength ($\lambda$B). When bounded by the pair of fiber Bragg gratings 94, the sensing coil 92 acts as a sensor. The length of the sensing coil 92, and hence the magnitude of the acoustic pressures impingent upon it, can be determined using interferometric interrogation techniques, such as well-known, Fabry-Perot, Michelson, or Mach-Zehnder techniques. As these interrogation schemes and the optical physics of Bragg gratings are well known in the art, they are only briefly explained. In general, a series of optical pulses are sent by well-known optical source/detection equipment (not shown) to the sensing coil 92 through an ingress fiber 98 of the fiber optic cable 90. Reflections of the pulses from the partially-transmissive fiber Bragg gratings 94 are sent back to the optical source/detection equipment through the lead 98. By assessing the phase shift in pulses coincidently reflected from the two fiber Bragg gratings 94, the length of the coil 92 can be determined, as is well known. Such interferometric schemes are disclosed in U.S. patent application Ser. No. 09/726,059, filed Nov. 29, 2000, which is incorporated herein by reference. An egress fiber 99 can be connected to (i.e., multiplexed with) other optical components or sensors deployed with the hydrophone 10, and if such additional components do not exist, the egress lead 99 can be terminated.

In some applications, it may not be practical to form the sensing coil 92 and the fiber Bragg gratings 94 along a continuous piece of optical fiber. Instead, the individual components, such as the leads 98 and 99, the sensing coil 92, and the fiber Bragg gratings 94 can be individually formed and then coupled or (fusion) spliced together. The splices in FIG. 4 are denoted by a slanted slash mark having reference numeral 96. As can be seen in FIG. 4, splices 96 may be performed to couple the individual optical components (leads 98 and 99, fiber Bragg gratings 94, and sensing coil 92) together.

In the present embodiment, a splice housing 86 used to house the splices 96 and fiber Bragg gratings 94 is connected to the hydrophone 10 by the intra-station cable or capillary tube 84. As best described in the above-incorporated '903 application, the splice housing 86 can include a number of features for organizing and storing the optical fiber 90 when the disclosed hydrophone 10 is used with other hydrophones or sensors in an optical array. However, use of a separate splice housing 86 is not strictly necessary, as the hydrophone 10 can independently hold the various components of the fiber optic circuit. One skilled in the art will realize that the fiber optic circuit can be arranged in a number of ways, such as those discussed in the '903 application.

II. Second Hydrophone Embodiment

Figure 5:
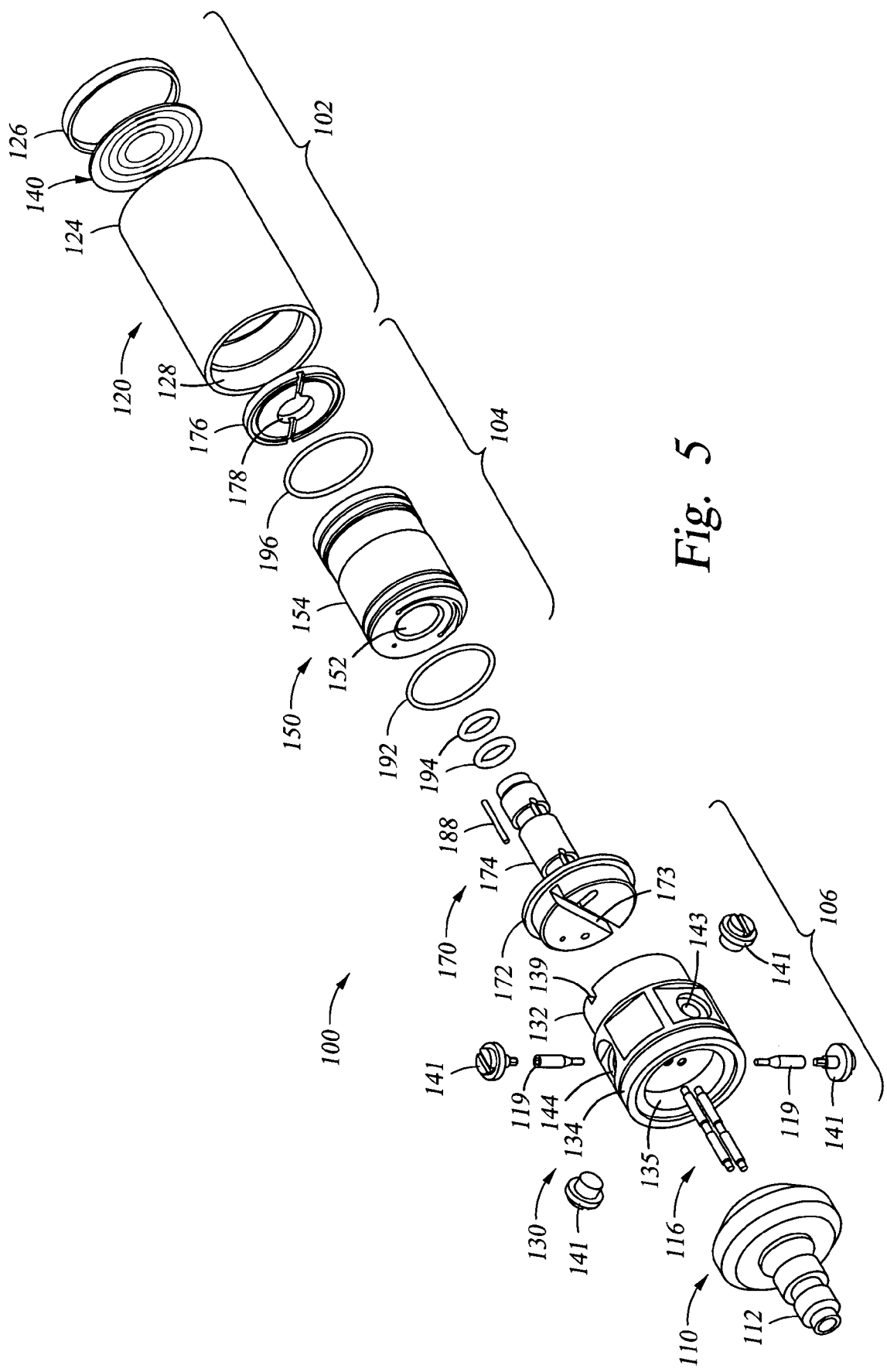
FIG. 5 illustrates an exploded view of a second embodiment of a hydrophone.

Referring to FIGS. 5 and 6A-B, another embodiment of a hydrophone 100 is illustrated. FIG. 5 shows the hydrophone 100 in an exploded view, and FIGS. 6A-B show the hydrophone 100 in an assembled state as illustrated by orthogonal cross-sections. For illustrative purposes, general details and overall assembly of the hydrophone 100 will first be discussed. Thereafter, a more detailed discussion of the various components of the hydrophone 100, and more specific assembly details, such as the routing of optical fiber within the hydrophone 100, will be discussed.

A. General Description of the Second Embodiment

As best shown in FIG. 5, the hydrophone 100 is comprised of three subassemblies: a front subassembly 102, an internal subassembly 104, and a rear subassembly 106. The front subassembly 102 includes a front housing 120, a diaphragm 140, and a clamp ring 126. During fabrication of the front subassembly 102, the diaphragm 140 and clamp ring 126 are welded to an end 124 of the housing 120.

The internal subassembly 104 includes a sensing mandrel 150, a mounting assembly 170, cross-rotational pin 188, and a plurality of O-rings 192, 194, and 196. The sensing mandrel 150 has an internal bore or tunnel 152, an outer sensing surface 154, a top end face, a bottom end face, and a number of fiber organizing features detailed below. The mounting assembly 170 includes a mounting disk 172 having an attached axle 174 and includes an end disk 176. During fabrication of the internal subassembly 104 and as best shown in the assembled state of FIGS. 6A-B, optical fiber 90 is wound on and bonded to the sensing mandrel 150 to form a sensing coil 92. An end face O-ring 192 is positioned against the mounting end disk 172, and mounting O-rings 194 are installed on the axle 174. Then, the sensing mandrel 150 with the wound and bonded optical fiber is mounted on the mounting assembly 170 by inserting its bore 152 over the axle 174 and O-rings 194. Ingress and egress leads 91 and 93 of the optical fiber 90 are passed from the sensing mandrel 150 through an internal channel or tunnel 180 of the axle 174. Another end face O-ring 196 positions against the end disk 176, and the end disk 176 is welded to the end of the axle 174 to hold the sensing mandrel 150 on the mounting assembly 170.

As best shown in FIG. 5, the rear subassembly 106 includes a rear housing 130, feedthrough ferrules 116, plugs 141, and valves 119 such as needle valves. During fabrication of the rear subassembly 106, and as best shown in the assembled state of FIGS. 6A-B, the feedthrough ferrules 116 pass optical fiber 90 and seal portions of the hydrophone 100. The ferrules 116 are installed and welded into passages 136 formed in the rear housing 130. The valves 119 and plugs 141 are used to seal filling passages 138 (shown in FIGS. 8A-B) from fill/evacuation ports 143 and valve ports 144 located on the side of the rear housing 130 during later assembly steps as discussed below. As shown in FIG. 5, the plugs 141 adjacent the valves 119 may include an end, e.g. a hex end, that mates with an end of the valves 119 such that rotation of the plugs 141 can open and close the valves 119.

The front, interior, and rear subassemblies 102, 104, and 106 can be separately fabricated, calibrated, tested, and stored for future assembly. To complete assembly of the hydrophone 100, the interior subassembly 104 is first coupled to the rear subassembly 106. When coupling these subassemblies 104 and 106, the ingress and egress leads 91 and 93 of the optical fiber passing through the internal channel 180 of the axle 174 are passed through the feedthrough ferrules 116 installed in the rear housing 130. The mounting assembly 170 is attached to the rear housing 130 by welding the mounting disk 174 to a mating end 132 of the rear housing 130. The feedthrough ferrules 116 are then sealed using techniques known in the art.

Next, the front subassembly 102 is positioned over the interior subassembly 104 and welded to the rear subassembly 106. The front housing 120 then fits over the mounted sensing mandrel 150 and the mounting assembly 170. The end 128 of the front housing 120 is then welded to the rear housing 130 thus forming an inner chamber 123 within the hydrophone 100.

The hydrophone is substantially free of entrapped air and filled with a Newtonian fluid. In a filling procedure, appropriate connections are made to the fill/evacuation ports 143 located on the side of the housing 130 in order to introduce an internal fluid into the chamber 123 and evacuate the air therein. Thus, the valves 119 are in an open position during the filling procedure, thereby permitting fluid communication between the fill/evacuation ports 143 and the filling passages 138. Air is evacuated from the chamber 123 through one of the filling passages 138 in the rear housing 130, and then the chamber 123 is filled with internal fluid, such as silicone oil, through another of the filling passages 138. Evacuation of air is preferably performed by a pump. With the chamber 123 filled with the internal fluid, the valves 119 are closed and the plugs 141 are inserted into the corresponding fill/evacuation ports 143 and valve ports 144 to seal the chamber 123. In this manner, the valves 119 can be closed upon filling the chamber 123 without disconnecting from the fill/evacuation ports 143 in order to ensure that the chamber 123 remains free from air.

In final assembly procedures, the cable member 110 is coupled to a cable or capillary tube 84, which connects the hydrophone 100 to a splice housing, fiber organizer, other sensor, or the like (not shown). More specifically, an extension 112 of the cable member 110 is attached to the cable or capillary tube 84 using techniques known in the art, such as brazing or welding. Because the capillary tube 84 is a thin tube having a diameter of approximately ⅛ to 1/16-inch, brazing is a preferred technique for attaching the tube 84 to the cable member 110. Connection of the cable member 110 to the remainder of the hydrophone 100, and connection (e.g., splicing) of the optical fibers, is disclosed later.

Preferably, the front housing 120, rear housing 130, and the cable member 110 are composed of the same material. Selection of the material can depend on the characteristics of the environment to be encountered. For example, if a relatively non-corrosive environment is to be encountered, the housing components 110, 120, and 130 can be composed of stainless steel, such ASTM UNS S17400. For a more aggressive corrosive environment, however, the housing components 110, 120, and 130 can be composed of INCONEL or other like alloy. Preferably, deep radial EB welds are used to attach the housing components 110, 120, and 130 together. The mounting disk 172, axle 174, and end disk 176 are preferably composed of the same material as the back housing 130, although this is not strictly necessary because these components are not subject to a corrosive environment.

B. Detailed Description of Front Subassembly

Figure 7:
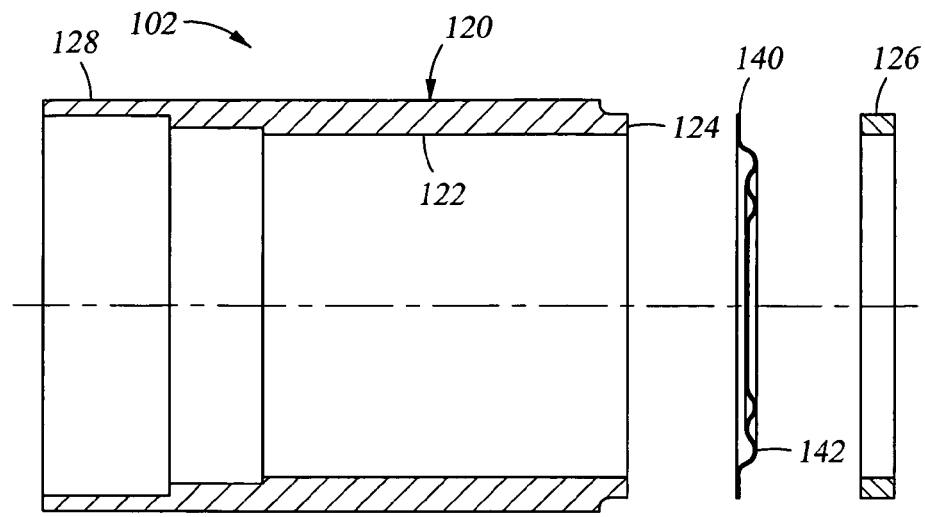
FIG. 7 illustrates a cross-sectional view of a housing, a diaphragm, and a clamp ring of the hydrophone of FIG. 5.

More details of the front subassembly 102 of the hydrophone are shown in the cross-sectional view of FIG. 7. As noted above, the front subassembly 102 includes front housing 120, diaphragm 140, and clamp ring 126. The front housing 120 can have an outer diameter of about 24-mm and a wall thickness of about 2-mm. The relatively thin diaphragm 140 is composed of metal, such as stainless steel, which is suitable for the intended environment of the hydrophone 100. When the hydrophone 100 is assembled and deployed, the diaphragm 140 responds to acoustic pressures in the fluidic media in which the hydrophone is placed. Consequently, the diaphragm 140 preferably minimally dampens such acoustic pressures and efficiently transmits them to the internal chamber 123 of the hydrophone 100. The diaphragm 140 is preferably thin and flexible and can have a thickness from approximately 2 to 4-mil (0.05 to 0.1-mm). The diaphragm 140 also preferably defines a plurality of corrugations 142 to facilitate the flexure of the diaphragm 140. A suitable diaphragm for use with the disclosed hydrophone 10 can be obtained from Kearflex Engineering Company of Rhode Island. Other diaphragm designs and materials may also be used, such as a planar membrane. The diaphragm functions to transmit acoustic signals as described and further functions to equalize the dc pressure differential between the inside of the hydrophone and the environment outside of the hydrophone for embodiments of the invention without bellows, capillary tube or other pressure compensation device. It will be appreciated that the diaphragm performs this compensation function by flexure of the diaphragm while maintaining the ability to transmit the acoustic pressures as described herein above.

As noted above, the diaphragm 140 attaches to the first end 124 of the front housing 120 during pre-assembly. EB welding, laser welding, or other techniques known in the art can be used to attach the diaphragm 140. In a preferred technique, the clamp ring 126 is used with an EB weld to attach the diaphragm 140 to the end 124 of the front housing 120. During this assembly step, the front housing 120 is held in place, and the diaphragm 140 is positioned against the end 124 of the housing 120. The clamp ring 126 is then pressed against the periphery of the diaphragm 140. Thus, the clamp ring 126 holds the diaphragm 140 tightly against the end 124 of the front housing 120. This minimizes the potential for gaps between these components, which thereby minimizes tolerance requirements during fabrication. Finally, a conventional sized E-beam electrode implements a deep radial EB weld around the end 124, clamp ring 126, and sandwiched diaphragm 140 so that a seal of the thin material of the diaphragm 140 is made to the thicker material of the front housing 120 and clamp ring 126. After welding, the clamp ring 126 becomes an integral part of the welded subassembly of the front housing 120. Moreover, the clamp ring recesses the diaphragm 140 slightly within the hydrophone 100, which helps to protect the diaphragm 140 from mechanical damage.

C. Detailed Description of Rear Subassembly

Figure 8A:
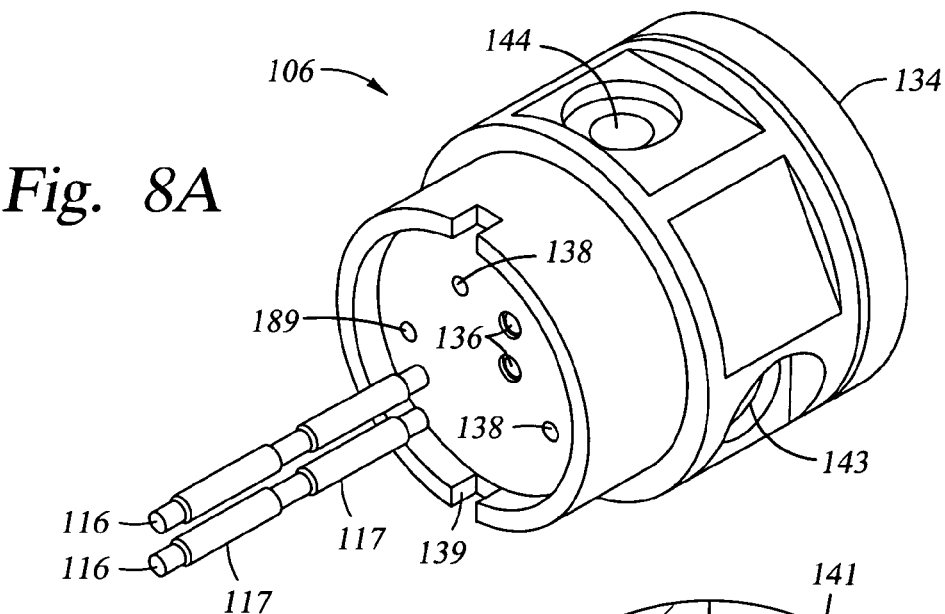
FIG. 8A illustrates an isometric view of a rear subassembly for the hydrophone of FIG. 5.
Figure 8B:
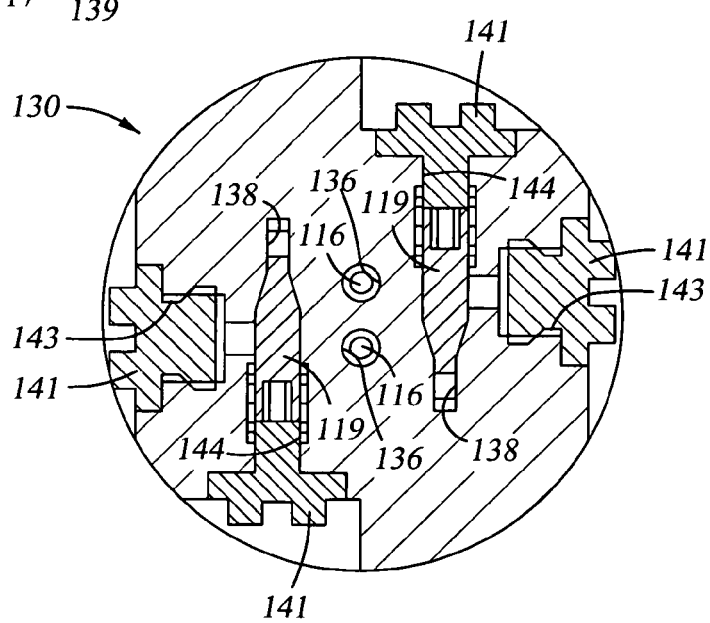
FIG. 8B illustrates a section view of the subassembly for the hydrophone of FIG. 5 across line 8B-8B of FIG. 6A.

Further details of the rear subassembly 106 of the hydrophone are shown in FIGS. 8A and 8B, which respectively illustrate exploded and cross-sectional views. As noted above, the rear subassembly 106 includes rear housing 130, feedthrough ferrules 116, plugs 141, and valves 119. The rear housing 130 has a mating end 132 for attaching with the mounting assembly (172 shown in FIGS. 6A-B), and a cable end 134 for attaching with the cable member (110 shown in FIGS. 6A-B). The cable end 134 defines a recessed space (135 shown in FIGS. 6A-B).

Feedthrough passages 136 are formed (e.g., drilled) in the rear housing 130, and feedthrough ferrules 116 are installed in these passages 136 during assembly procedures. The feedthrough ferrules 116 are preferably welded into these passages 136 in the back housing 130 using an EB welding technique known in the art. Preferably, the feedthrough ferrules 116 are composed of the same material as the back housing 130. The two feedthrough passages 136 and ferrules 116 represent an alternative fiber feedthrough configuration. In the configuration using the dual ferrules 116, the ingress and egress leads (91 and 93 shown in FIG. 6A-B) of optical fiber can be separately inserted into each ferrule 116 during later assembly procedures. The chamber (123 in FIGS. 6A-B) of the hydrophone will potentially be subject to high pressures during deployment (e.g., as high as 20 kpsi), while the recessed area 135 of the back housing 130 in the assembled hydrophone 100 in FIG. 6A-B will be at approximately atmospheric pressure. Thus, the feedthrough ferrules 116 preferably constitute high-pressure barriers, and as previously mentioned can constitute the optical fiber feedthroughs disclosed in U.S. Pat. Nos. 6,445,868 and 6,526,212, which are both incorporated herein by reference. To effectuate the formation of a high-pressure barrier in later assembly steps, the ferrules 116 are typically sealed by an epoxy, glass, or other sealing material known in the art depending on the intended pressures and temperatures to be encountered. By passing each fiber lead (91 and 93 shown in FIG. 6A-B) through its own ferrule 116, failure risks associated with the seal formed within the ferrules 116 can be reduced. To further reduce failure risks of the feedthrough seal, each ferrule 116 preferably contains redundant sealing features or pockets 117 for the sealing material.

In addition to the feedthrough passages 136, filling passages 138 are defined in the rear housing 130 for filling chamber 123 of the hydrophone 100 with internal fluid during later assembly steps. Two filling passages 138 are provided so that one passage 138 can be used for filling while the other passage 138 is used for venting during the filling procedure. Preferably, the mating end 132 of the rear housing 130 defines channels 139 that align with corresponding channels on the mounting disk (172 of the sensor mounting assembly 170 shown in FIG. 6A-B) in order to permit fluid flow from the filling passages 138. When the rear housing 130 is assembled on the hydrophone, as best shown in the cross-sectional view of FIG. 6B, corresponding channels 173 on the mounting disk 172 are aligned with the channels 139 of the mating end to allow internal fluid to pass from the passages 138 to the chamber 123 of the front housing 120 during the filling procedure. Additionally, the internal fluid may flow from the filling passages 138 through the corresponding channels 173 on the mounting disk 172 and enter the chamber 123 at the internal channel 180 of the mounting assembly 170.

Referring specifically to FIG. 8B, each valve 119 of the rear subassembly 106 seals against a valve seat 118 in the housing 130 in order to selectively seal filling passages 138 from the fill/evacuation ports 143 during the filling process. As shown, the valve ports 144 in the housing provide a threaded bore such that rotation of the valves 119 that are externally threaded opens and closes the valves. After filling the hydrophone with the internal fluid and closing the valves 119, plugs 141 are used to seal the filling passages 138. Both the plugs 141 and valves 119 are used to produce a redundant seal in each passage 138. Once tightened to seal the filling passages 138, the plugs 141 may be tack welded in place to prevent loosening. In this way, the potential for leakage through the filling passages 138 can be greatly diminished regardless of environmental and handling conditions.

D. Detailed Description of the Interior Subassembly

More details of the interior subassembly 104 of the disclosed hydrophone 100 are shown in FIGS. 9A, 9B, 9C, 10, 11, 12, 13A, and 13B. As noted above and best shown in FIG. 12, the interior subassembly 104 includes sensing mandrel 150, mounting assembly 170, counter-rotation pin 188, and O-rings 192, 194, and 196. To complete the interior subassembly 104, the sensing mandrel 150 is first wound with optical fiber. Then, the sensing mandrel 150 is installed on the mounting assembly 170.

1. The Sensing Mandrel

Figure 9A:
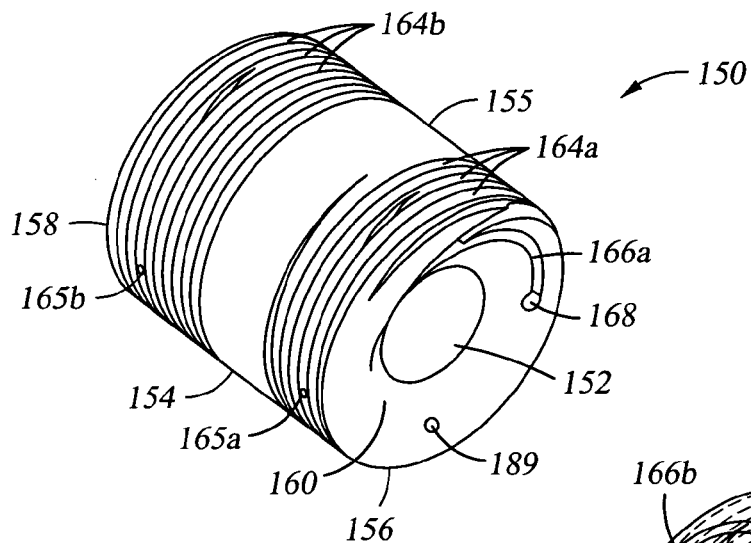
FIGS. 9A-C illustrate various views of a sensing mandrel for use with a hydrophone.
Figure 9B:
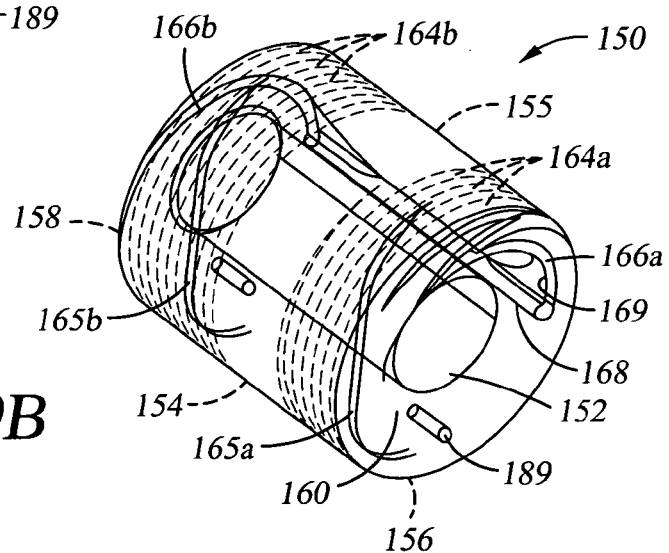

FIGS. 9A and 9B show the sensing mandrel 150 in isolation. In FIG. 9A, the sensing mandrel 150 is illustrated in a perspective view showing the external surfaces of the mandrel 150. In FIG. 9B, internally defined recesses, holes, and bores are shown in solid lines, while the external surfaces are shown in dashed lines for contrast. The sensing mandrel 150 has an inner bore 152, an outer surface 154, and top end face 156, and a bottom end face 158. As best shown in FIG. 9B, both the top and the bottom end faces 156 and 158 preferably define bores 189 for receiving ends of the counter rotational pins (not shown) described below.

Figure 9C:
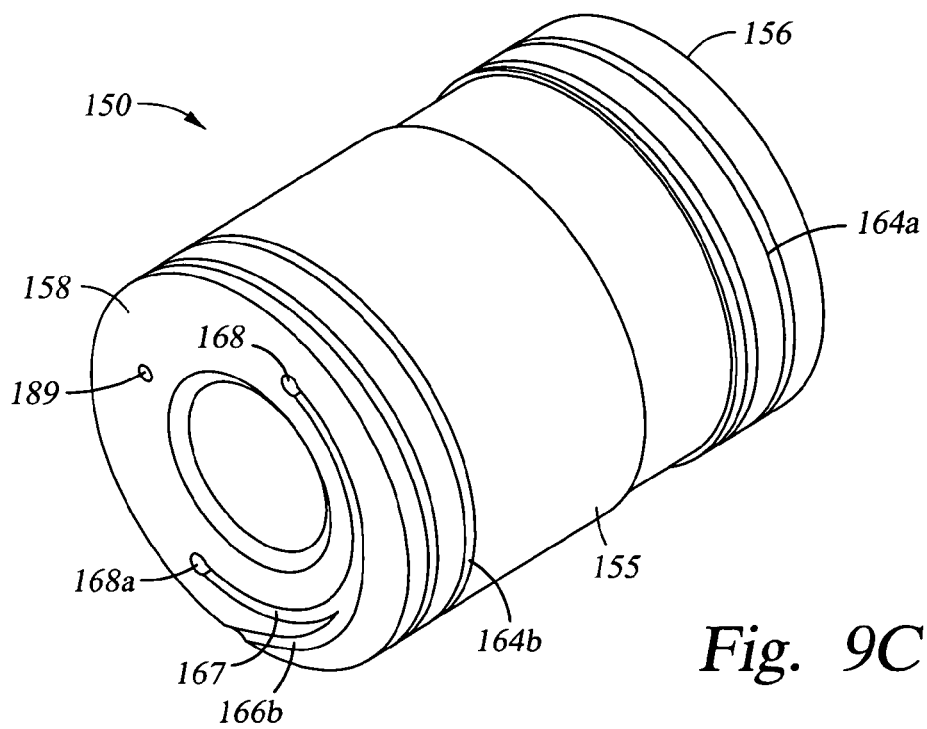

FIG. 9C illustrates another embodiment of a mandrel 150 having two tunnels 168 and 168a. The wiring procedure used with the mandrel 150 shown in FIG. 9C provides for disposing a single FBG within each tunnel 168, 168a. In this manner, each FBG is protected from possible strain on the FBG.

In the present embodiment, the outer diameter of the sensing mandrel 150 is preferably about 18 to 20-mm, and the inner diameter is preferably about 4 to 12-mm. The length of the sensing mandrel 150 is preferably about 15 to 25-mm. The sensing mandrel 150 is preferably composed of any polymer that can withstand high temperatures and pressures, such as Teflon™ (polytetrafluoroethylene), Torlon™ 4203L (polyamide-imide), or PEEK 450G (polyetheretherketone) or other similar materials. To form the mandrel 150 with the internally defined recesses, holes, and bores described below, the mandrel 150 can be manufactured by machining, by injection molding, or by a combination thereof.

2. Fiber Organizing Features

Optical fiber (not shown) is wound and bonded to the sensing mandrel 150 during assembly procedures. To facilitate organization and routing of optical fiber around and about the sensing mandrel 150, the mandrel employs a number of features. In one fiber organizing feature best shown in FIG. 9A, the top end face 156 has a rounded end 160 at the internal bore 152. As detailed below, this rounded end 160 is used for passing optical fiber to and from the channel (180 of the axle 174 shown in FIGS. 6A-B) when routing optical fiber during later assembly procedures.

In another fiber organizing feature best shown in FIG. 9A, the external surface of the sensing mandrel 150 defines helical grooves 164a and 164b divided by a substantially flat sensing surface 155. The first helical groove 164a routes ingress fiber from the top end face 156 to the sensing surface 155 of the mandrel 150 where a sensing coil, described below, is wound and bonded. The second helical groove 164b routes egress fiber from the sensing surface 155 to the bottom end face 158. Preferably, the helical grooves 164a, 164*b* on the sensing mandrel 150 contain recesses 165*a*, 165*b* formed within the grooves 164*a*, 164*b* to hold a recoated portion of the optical fiber, as will be explained in more detail below.

In a further fiber organizing feature best shown in FIG. 9B, a tunnel 168 passes through the body of the mandrel 150 from the top end face 156 to the bottom end face 158. To gradually transition the optical fiber from the tunnel 168 at each of these faces 156, 158, the faces are respectively formed with spiral grooves 166*a*, 166*b*. The transitions between the ends 169 of the tunnel 168 and the spiral grooves 166*a*, 166*b* are preferably curved so that the optical fiber does not make too small of a turn when routed on and through the mandrel 150. As one skilled in the art will appreciate, the optical fiber used on the sensing mandrel 150 of the hydrophone can be as thin as 80 to 125-microns in diameter. Therefore, the surfaces and fiber organizing features on the sensing mandrel 150—as well as the rest of the hydrophone where optical fiber is routed—preferably limit the optical fiber to bend diameters that are greater or equal to 10-mm to limit high mechanical stresses of the fiber and/or excessive light loss. As one skilled in the art will also appreciate, the central concentric bore 152 in the sensing mandrel 150 (or channel 180 in axle 174) can also constitute a fiber-routing tunnel in other useful embodiments, and therefore a separately formed tunnel 168 is not strictly necessary.

The mandrel 150 shown in FIG. 9C additionally includes the two tunnels 168 and 168*a*, additional corresponding end face helices (not shown) on the top end face 156, and a connecting groove 167 that provides a path between the two tunnels 168 and 168*a* along the bottom end face 158. Since each FBG is protected within each tunnel 168, 168*a*, the mandrel 150 shown in FIG. 9C may not require the recesses formed within the grooves as shown in FIG. 9B.

3. Exemplary Optical Circuit

Figure 10:
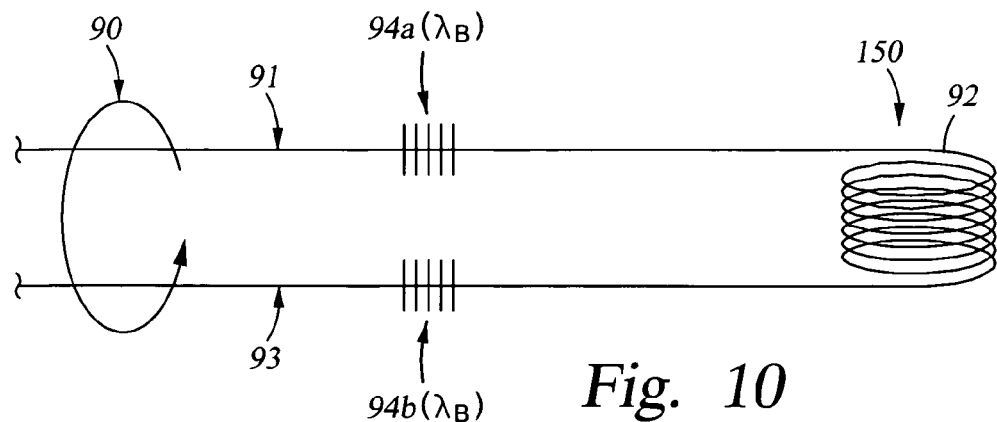
FIG. 10 illustrates an exemplary optical circuit for the hydrophone of FIG. 5.

Referring to FIG. 10, an exemplary optical circuit useable with the disclosed hydrophone 100 is diagrammatically illustrated. The optical circuit has a sensing coil 92 that is wound and bonded to the sensing surface 155 of sensing mandrel 150. The sensing coil 92 is bounded by a pair of fiber Bragg gratings 94*a*, 94*b*. The gratings 94*a*, 94*b* preferably reflect light of the same wavelength (λB) and hence are easily interrogated using interferometric techniques as described above to determine the length of the sensing coil 92, and hence the magnitude of acoustic pressures impingent upon it.

The individual components, such as the ingress and egress leads 91 and 93, the sensing coil 92, and the fiber Bragg gratings 94*a*, 94*b*, can be individually formed and then coupled or spliced together by methods known in the art. In this circumstance, the Bragg gratings 94*a*, 94*b* and splices (not shown) may be wound around the sensing mandrel 150, otherwise housed within the hydrophone, or housed in an appropriate splice housing (not shown) as discussed above. However, in a preferred embodiment, splices are not used between the fiber Bragg gratings 94*a*, 94*b* and the sensing coil 92. Instead, the fiber Bragg gratings 94*a*, 94*b* are preferably formed in a continuous piece of optical fiber 90 using exposure processes well known in the art. One skilled in the art will recognize that the polyamide coating normally present on the optical fiber 90 is typically removed prior to the grating exposure process. After exposure, the fiber 90 is recoated, for example, using the recoating procedure disclosed in U.S. patent application Ser. No. 09/417,563, filed Oct. 14, 1999, with the recoat procedure forming a recoat around the fiber 90 at the location of the fiber Bragg gratings 94*a*, 94*b* which is approximately 1-mm in diameter and 10 to 15-mm long. The optical fiber 90 with the recoated fiber Bragg gratings 94*a*, 94*b* is then wound around and bonded to the sensing mandrel 150 as explained in the next section.

4. Routing of Optical Circuit

Figure 11:
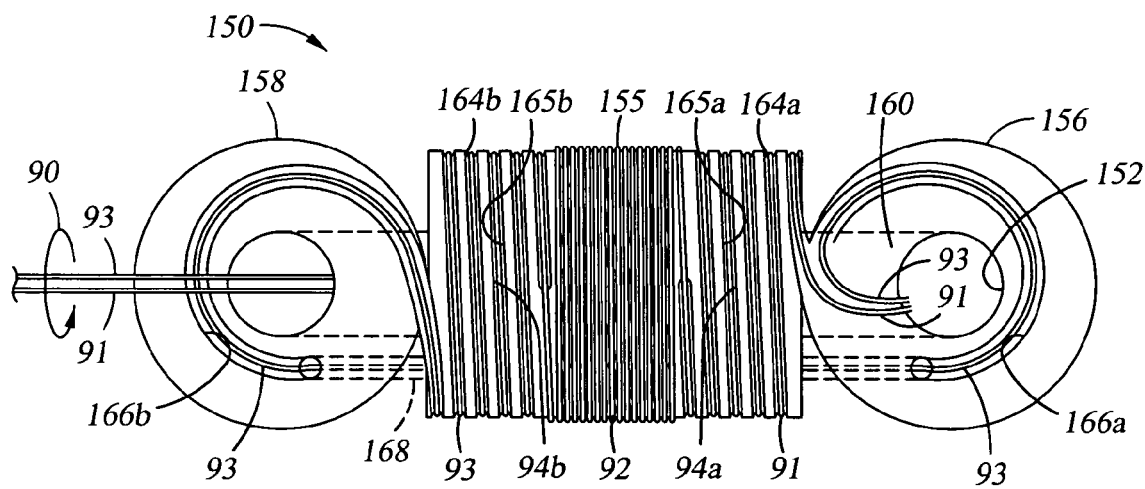
FIG. 11 diagrammatically illustrates the sensing mandrel with routed optical fiber for the hydrophone of FIG. 5.

Referring to FIG. 11, the sensing mandrel 150 and optical fiber 90 for the disclosed hydrophone 100 are diagrammatically illustrated to explain how the optical fiber 90 is routed on or around the mandrel 150. For simplicity, FIG. 11 shows a side view of the mandrel 150 with the end faces 156 and 158 rotated forward.

With the fiber Bragg gratings 94*a*, 94*b* formed within the fiber and then recoated, the fiber 90 with the gratings 94*a*, 94*b* is wound onto the mandrel. The fiber is bonded to the mandrel except at the location of the gratings. In particular, the ingress lead 91 of the continuous fiber 90 is wound along the helical groove 164*a*. The first Bragg grating 94*a* is placed within the protective recess 165*a* formed in the helical groove 164*a*, which is large enough to house the fiber recoat. This recess 165*a* is preferably flat so as not to bend the recoated fiber Bragg grating 94*a*.

The ingress lead 91 is then wound along the rest of helical groove 164*a* to the sensing surface 155 of the mandrel 150, where the fiber 90 is then wound to form the sensing coil 92 of the optical circuit. The coil 92 of optical fiber 90 can be several meters in length, such as from about 3 to 6 or more meters. The coil 92 may or may not be wound on top of itself to form several layers of coil around the sensing mandrel 150. The coil 92 is typically held firmly against the sensing mandrel 150 by a high temperature epoxy. As one skilled in the art will realize, more sensitivity can be obtained by using more wraps of coil 92 to increase its optical length. The optimal length for the coil 92 is therefore dictated by the desired sensitivity and the optical interrogation scheme to be used to read signals from the coil 92.

Next, the egress lead 93 from the sensing coil 92 is wound along the helical groove 164*b* on the mandrel 150, and the second Bragg grating 94*b* is placed in its protected recess 165*b* (similar to recess 164*a*) formed in the helical groove 164*b*. So configured, the pair of Bragg gratings 94*a*, 94*b* are not separated from the sensing coil 92 by a significant distance and are not loose, which minimizes spurious error signals caused by seismic and mechanical vibrations of the hydrophone.

Beyond the second fiber Bragg grating 94*b*, the egress lead 93 follows the helical grooves 164*b* to the end face 158 of the mandrel 150. At this point, the egress lead 93 is routed and bonded in the spiral groove 166*b* and follows the spiral groove 166*b* into the tunnel 168, which passes the egress lead 93 to the top end face 156 of the mandrel 150. At the top end face 156, the egress lead 93 is routed and bonded in the spiral groove 166*a* and meets with the ingress lead 91 for later insertion through the bore 152 and into the channel 180 of the mounting assembly 170, as described below.

Routing of the fiber 90 with respect to the mandrel 150 shown in FIG. 9C begins by feeding the ingress lead 91 of the fiber 90 through the tunnel 168 at the top end face 156 such that the first fiber Bragg grating 94*a* is disposed in the tunnel 168. The fiber 90 is then positioned within spiral groove 166*b* on the bottom end face 158 and follows the spiral groove 166*b* to the surface of the mandrel 150 where the fiber 90 is wound toward the top end face 156. Next, the fiber 90 routes through the tunnel 168*a* such that the second fiber Bragg grating 94*b* is disposed in the tunnel 168*a*. At the bottom end face 158, the egress lead 93 passes along connecting groove 167 from tunnel 168*a* to tunnel 168 where the fiber 90 returns back through the tunnel 168 to the top end face 156 and later inserts through the bore 152 and into the channel 180 of the mounting assembly 170. In this manner, each grating 94a, 94b is protected within its own tunnel 168, 168a. This winding procedure is particularly useful when the fiber Bragg gratings 94a, 94b are long.

E. Mounting Assembly and Completion of Interior Subassembly

Figure 12:
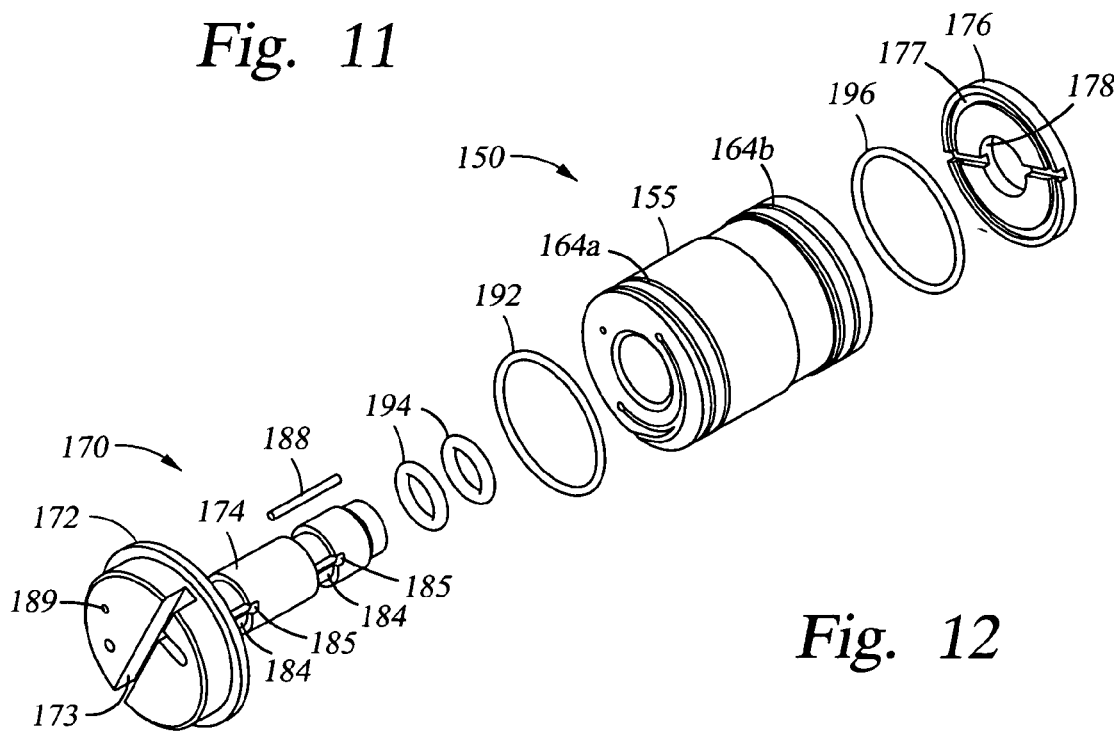
FIG. 12 illustrates an exploded view of a mounting assembly and sensing mandrel of FIG. 9C for the hydrophone of FIG. 5.
Figure 13A:
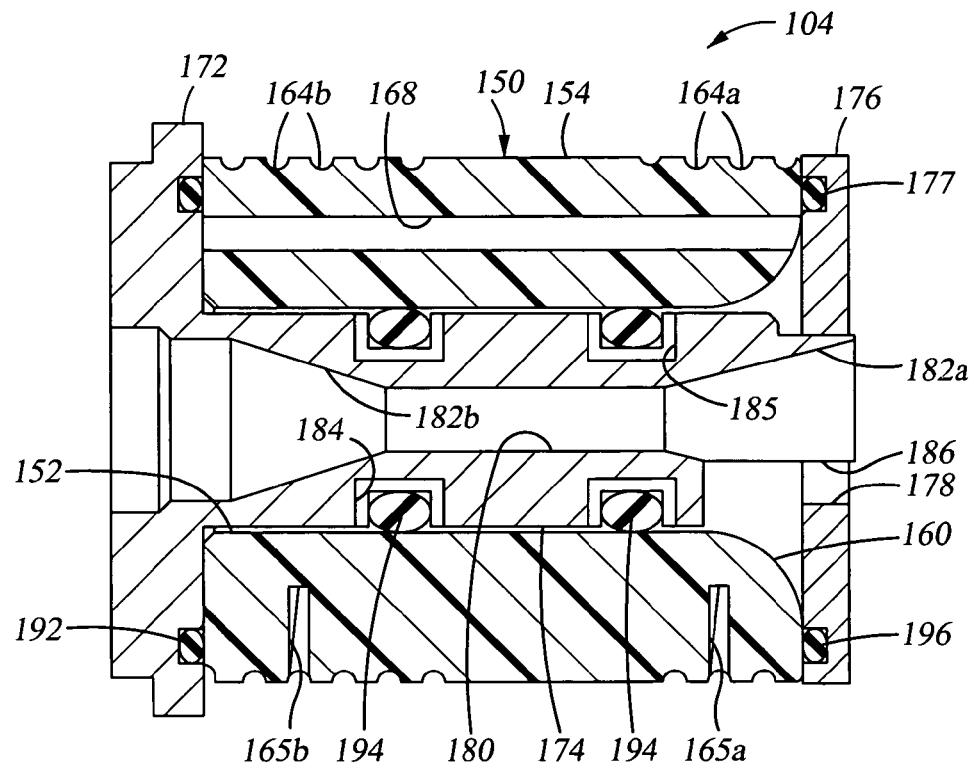
FIGS. 13A-B illustrate orthogonal cross-sections of the mounting assembly and sensing mandrel of FIGS. 9A-B in an assembled state.
Figure 13B:
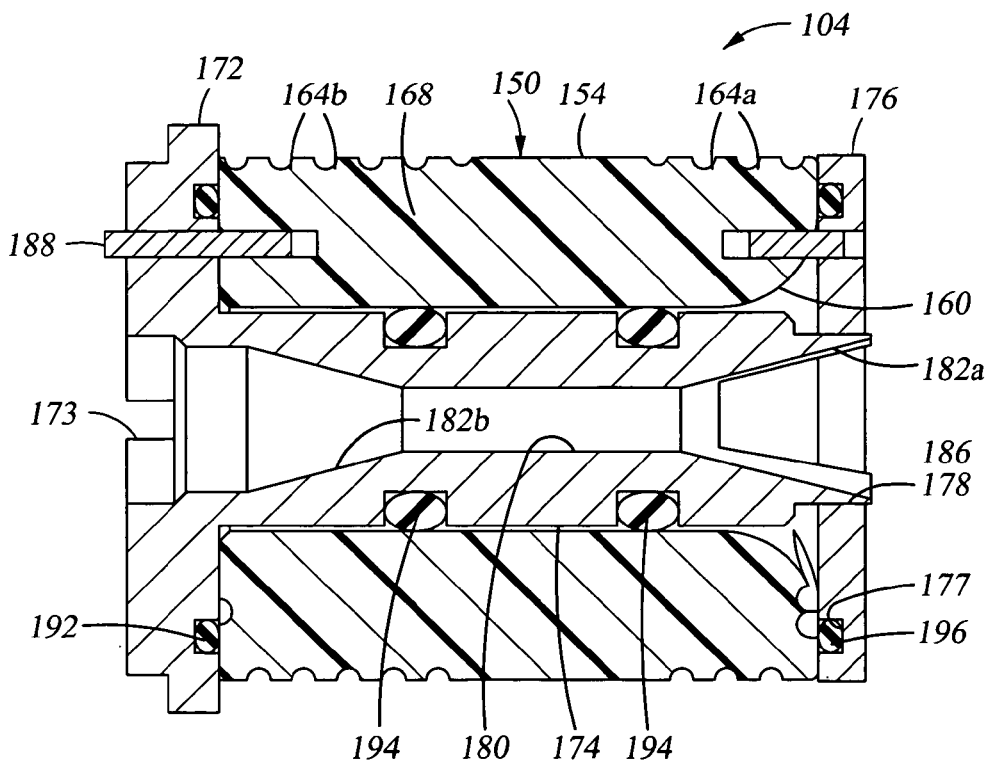

With the optical fiber 90 wound and bonded on the sensing mandrel 150, assembly of the interior subassembly 104 can be completed. Referring now to FIGS. 12, 13A, and 13B, the mounting assembly 170 and the sensing mandrel 150 of the interior subassembly 104 are shown in more detail. In FIG. 12, the mounting assembly 170 and the sensing mandrel 150 are illustrated in an exploded perspective view. In FIGS. 13A and 13B, the mounting assembly 170 and the sensing mandrel 150 are shown in an assembled state along orthogonal cross-sections. For clarity, optical fiber wound and bonded on the mandrel 150 is not shown in FIGS. 12, 13A, and 13B.

As noted above, the mounting assembly 170 includes mounting disk 172, axle 174, and end disk 176. The mounting disk 172 attaches to the mating end 132 of the rear housing 130 (FIG. 8A). The mounting disk 172 defines corresponding channels 173 for aligning with the channels 139 of the rear housing 130 (FIGS. 8A and 8B). The side of the mounting disk 172 with the axle 174 has an annular groove 177 for the end face O-ring 192.

The axle 174 is preferably integrally formed with the mounting disk 172 and defines recesses 184 for the mounting O-rings 194. Preferably, cutaway slots 185 are provided in the axle 174 at the O-ring recess 184. When the hydrophone is assembled and evacuated of air, the cutaway slots 185 allow air to be evacuated from internal spaces between the sensing mandrel 150 and the mounting assembly 170, as shown in FIG. 13A. Likewise, these cutaway slots 185 allow internal fluid to pass under the mounting O-rings 194 to fill the internal spaces during the filling procedure. Although not shown in every instance, it should be appreciated by one skilled in the art that cutaway slots 185 could be advantageously located at most or all of the O-ring locations to facilitate the evacuation of air and the fluid passage during the filling procedure.

The mounting disk 172 and axle 174 define an internal channel 180 therethrough for the passage of ingress and egress leads of optical fiber. Preferably, and as shown in FIGS. 13A-B, the channel 180 has first and second conical ends 182a, 182b for smoothly routing the optical fiber through the channel 180. The distal end of the axle 174 defines a window 186 for the passage of optical fiber from the top end face 156 of the sensing mandrel 150 to the channel 180. The end disk 176 defines an annular groove 177 for the end face O-ring 196 and defines a central opening 178 for attaching to the distal end of the axle 174.

It is believed that stress distributions in the sensing mandrel 150 can be made more uniform if the sensing mandrel 150 is not rigidly affixed to the remainder of the hydrophone housing, such as rear housing 130. Consequently, the present embodiment of the hydrophone "suspends" the sensing mandrel 150 in the hydrophone housing using the elastomeric O-rings 192, 194, and 196 on the mounting assembly 170. The two mounting O-rings 194 center the sensing mandrel 150 on the axle 174 of the mounting assembly 170, and the end face O-rings 192 and 196 on each end face 156 and 158 of the sensing mandrel 150 retain the longitudinal position of the sensing mandrel 150 on the axle 174.

To assemble the sensing mandrel 150 onto the assembly 170, the end face O-ring 192 is positioned in the annular groove 177 on the surface of the mounting disk 172, and the mounting O-rings 194 are installed in the recesses 184 on the axle 174. The ingress and egress leads (not shown) from the top end face 156 of the sensing mandrel 150 are passed through the inner bore 152 of the sensing mandrel 150 and through the channel 180 of the mounting assembly 170. The inner bore 152 of the mandrel 150 is then inserted over the axle 174 and the mounting O-rings 194 until the bottom end face 158 is positioned adjacent the end face O-ring 192. The other end face O-ring 196 is positioned in the annular groove 177 of the end disk 176 of the mounting assembly 170. The end disk 176 is then positioned against the top end face 156 of the sensing mandrel 150, and the central opening 178 of the disk 176 is fit over the distal end of the axle 174. The end disk 176 is then clamped into position to compress the end face O-rings 192 and 196. With the end disk 176 compressed in place, the opening 178 of the end disk 176 is laser welded or EB welded to the distal end of the axle 174, although other attachment techniques known in the art can be used.

If necessary, counter-rotation pins 188 can be used on each end face 156 and 158 of the sensing mandrel 150 to prevent the mandrel 150 from torquing on assembly 170. The counter-rotation pins 188 can be inserted in the complimentary holes 189 formed in the end faces 156 and 158 of the sensing mandrel 150 and in the disks 172 and 176. The counter-rotation pins 188 are not intended to provide primary support for the sensing mandrel 150. Therefore, the counter-rotation pins 188 are preferably designed with sufficient clearance to avoid binding in the counter-rotation holes 189, which could subsequently distort the acoustic strains imposed on the sensing mandrel 150.

Because the hydrophone housing is filled with silicone oil or another appropriate internal sensor filling fluid, the material of the O-rings 192, 194, and 196 is suitably selected to maintain its elastomeric qualities over the expected operational lifetime of the hydrophone given the high pressure and temperature conditions of the intended environment. Depending on the conditions of a given application, suitable O-ring materials can include fluorocarbons compounds or parafluoro compounds, for example. One skilled in the art will appreciate that the O-rings 192, 194, and 196 are initially compressed during assembly to properly hold the sensing mandrel 150 both axially and transversely on the mounting assembly 170. Preferably, sufficient clearance is provided by the O-rings 192, 194, and 196 between surfaces of the sensing mandrel 150 and surfaces of the mounting assembly 170 such that the sensing mandrel 150 does not touch or rub on the mounting assembly 170 during handling or operation. For example, the gap between the inner bore 152 of the sensing mandrel 150 and the outer surface of the axle 174 can be about 250 to 500-microns.

Because the end disk 176 is welded to the distal end of the axle 174, the ingress and egress leads of optical fiber at spiral groove 166a are fed into the channel 180 of the axle 174 through window 186, which clears a space between the end disk 176 and the top end face 156 of the sensing mandrel 150 (Routing of the optical fiber through the window 186 of the axle 174 is best shown in FIGS. 6A-B). This is a preferred arrangement, although the optical fiber can also be passed outside of the end disk 176 and routed through hole 178 into channel 180.

F. Final Assembly of Present Embodiment

With the sensing mandrel 150 mounted on the axle 174, the interior subassembly 104 is complete. To then complete assembly of the hydrophone 100 and as best shown in FIGS.

6A-B, the mounting disk 172 can be welded to the mating end 132 of the rear housing 130. Then, the optical fiber leads 91 and 93 from the sensing mandrel 150 are routed from the channel 180 in the axle 174 to the feedthrough ferrules 116. Using the fiber organizing features and layout details described above, there is no loose fiber that can vibrate and create spurious signals. Then, the ferrules 116 are sealed. Next, the front housing 120 is welded to the rear housing 130. Then, the chamber 123 is filled with oil as describe above.

Thereafter, the cable member 110 (FIGS. 5, 6A, 6B), which has been pre-connected as described above to cable 84, is connected to rear housing 130. In this regard, it should be noted that the ingress and egress leads 91, 93 of optical fiber 90 extending from the ferrules 116 need to be connected (preferably spliced) to other fibers in the optical circuit so that they can communicate with the necessary optical source/detection equipment (not shown), and this can be accomplished in different ways. If the cable 84 coupled to the cable member 110 contains optical fibers, exposed ends of these intra-cable fibers can be spliced to the ingress and egress leads 91, 93 prior to attachment of the cable member 110 to the rear housing 130. In this case, the extra lengths of cable and the splices can be housed (i.e., coiled) in the recess 135 (FIG. 6B) formed between the cable member and the rear housing 130. If the cable 84 does not contain optical fibers, and if the ingress and egress leads 91, 93 are to be spliced into the optical circuit at a remote splice housing such as is disclosed in the above-incorporated '903 application, then the ingress and egress leads 91, 93 would be fed though the cable 84 so that they extend from its distal end (not shown) where they can be appropriately spliced and housed. In either case, the cable member 110 is ultimately preferably welded to cable end 134 of the rear housing 130 to complete the assembly of the hydrophone 100. In one embodiment, the outer diameter of the hydrophone 100 can be about 24-mm, and the hydrophone 100 can have an overall length of about 85 to 90-mm.

G. Optimization

When the assembled hydrophone 100 is deployed in environments having high temperatures, such as within an oil/gas well, the internal fluid within the chamber 123 of the hydrophone 100 will thermally expand, increasing pressure in the chamber 123 that can damage the diaphragm 140. As with the first hydrophone embodiment, the diaphragm 140 is preferably as thin and flexible as possible so that the acoustic signals being detected are not significantly attenuated.

Accordingly, and as with the first hydrophone embodiment, the hydrophone 100 of the present embodiment advantageously limits the amount of internal fluid required to fill the chamber 123 of the hydrophone 100. In particular, the mounting assembly 170 with the mounting disk 172, axle 174, and end disk 176 take up a substantial volume of the chamber 123 to limit the required amount of internal fluid to fill the chamber 123, thereby reducing the potential for increased pressure due to thermal expansion of the internal fluid. For example, in one embodiment of the disclosed hydrophone, the volume within the chamber 123 requiring internal fluid can be less than 2.5 cc under ambient conditions. Knowing the volume of internal fluid in the chamber 123 and its coefficient of thermal expansion, the pressure exerted by the internal fluid within the chamber 123 can be estimated, which provides the hydrophone designer some indication of how resilient the diaphragm 140 must be for a given operational environment. It is preferred that the various components within hydrophone 100 be formed, where possible, to take up as much free space within the chamber 123 without affecting hydrophone performance.

III. Third Hydrophone Embodiment Using a Deformable Bellows

Figure 14:
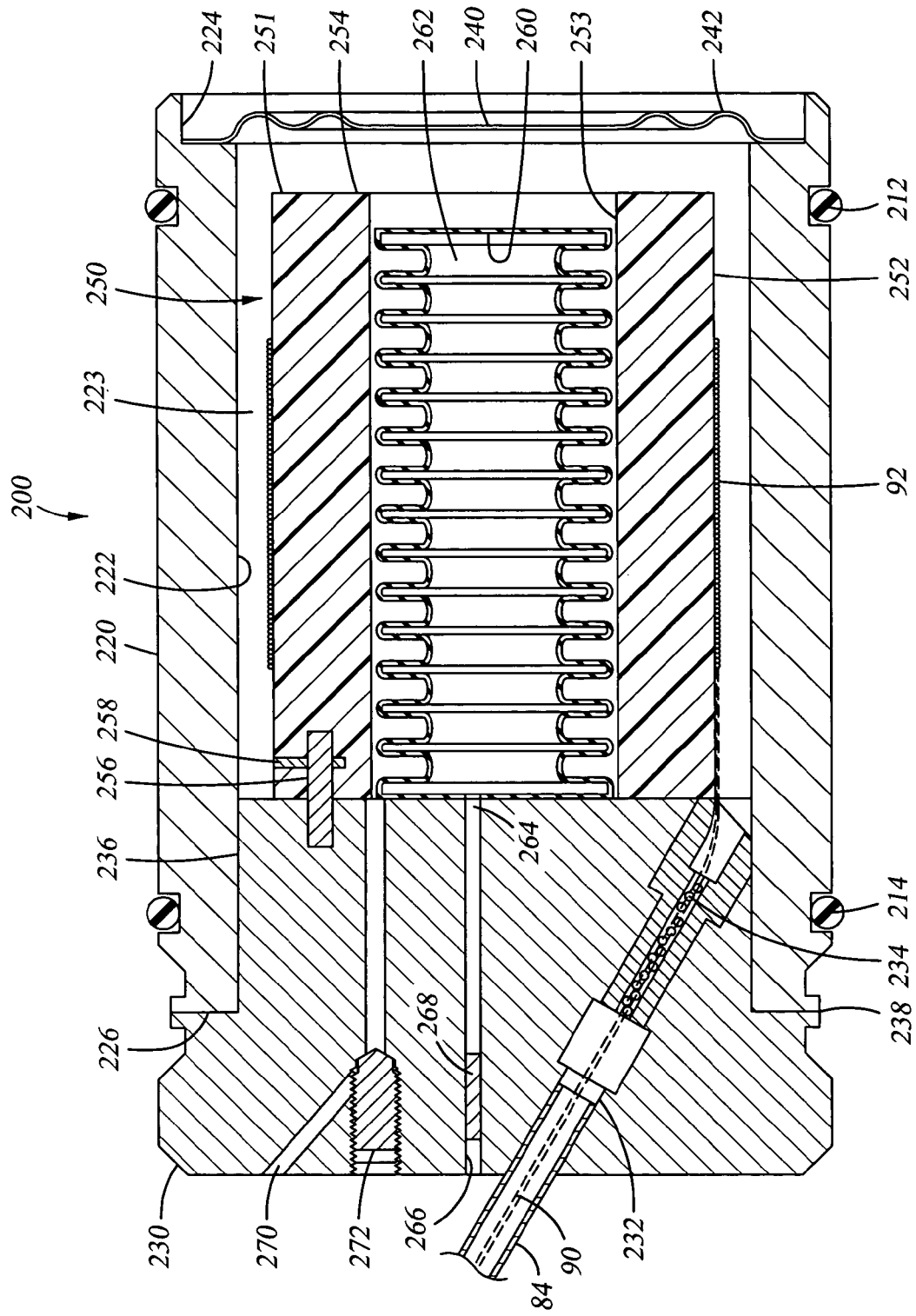
FIG. 14 illustrates a third embodiment of a hydrophone having a deformable bellows.

If a hydrophone diaphragm cannot tolerate the thermal expansion of the internal fluid in a given implementation, a deformable bellows may be incorporated into the hydrophone's inner chamber 123. FIG. 14 accordingly discloses another (third) embodiment of a hydrophone 200 illustrated in a cross sectional view and having such a pressure compensator or bellows 260. More specifically, the hydrophone 200 includes a housing 220, an end cap 230, a flexible diaphragm 240, a sensing mandrel 250, and the bellows 260. Because certain structures in hydrophone 220 have been disclosed and discussed with reference to the first two hydrophone embodiments, such as decoupling O-rings 212, 214, mandrel attaching pins 256, 258, cable 84, filling port 270, optical feedthrough 234, etc., further detailed discussion of these structures are not repeated. Similarly, methods of assembly earlier disclosed and discussed are not repeated for simplicity.

The housing 220 is preferably tubular and has an inner diameter 222, a first end 224, and a second end 226. The diaphragm 240 is attached to the first end 224, which can be recessed as shown. The end cap 230 is attached to the second end 226 by a suitable welding technique known in the art, such as tungsten-inert-gas (TIG) welding or Electron Beam (EB) welding. As one skilled in the art will understand, the static pressure inside the housing 220 will be substantially the same as that outside the housing 220 when the hydrophone 200 is deployed in a well. Therefore, welding of the end cap 230 to the housing is primarily made to seal the housing, as no substantial loads will be placed on the welded connection. Accordingly, in the present embodiment, two corners 238 are preferably formed where the end cap 230 and end 226 of the housing 220 are welded together. In this way, the two corners 238 can be easily melted during the welding process to form the seal between the end cap 230 and the housing 220. The end cap 230 can also include a shoulder 236 formed in the end cap 230 that disposes into the housing 220. For example, the shoulder 236 of end cap 230 can extend approximately 4.5-mm into the housing 220.

A cable or capillary tube 84 attached to an opening 232 of the end cap 230 carries optical fiber 90 to and from the sensing mandrel 250 contained within the housing 220. In the present embodiment, the tube 84 is a metallic capillary tube of about ⅛ to 1/16-inch in diameter that is preferably brazed to the opening 232 in the end cap 230. Alternatively, any other commonly used tube or cable for in-well applications can be used to carry the optical fiber 90 to and from the hydrophone 200. In addition, other techniques and methods known in the art, such as a mechanical fitting, can be used to connect a tube or cable to the end cap 230. The inner diameter 222 of the housing 220 forms a chamber 223, which is filled with an internal fluid, such as silicone oil. The sensing mandrel 250 and the bellows 260 are housed within the chamber 223. As before, the sensing mandrel 250 is tubular and is composed of a suitable polymer. One end of the sensing mandrel 250 is mounted to the end cap 230, for example, using pins 256, 258, and the other end is positioned adjacent the diaphragm 240. Optical fiber 90 is passed to and from the sensing mandrel 250 through the sealed optical feedthrough 234. The optical fiber 90 is wound around and bonded to the outer surface 252 of the sensing mandrel 250 to form a sensing coil 92. In this embodiment, the optical fiber 90 does not pass through the central bore in the sensing mandrel 250, but rather emerges proximate to the outer surface 252. As before, the sensing mandrel 250 is acoustically coupled to the fluidic media being measured by the flexible diaphragm 240 and the internal fluid in the chamber 223, both of which transmit acoustic pressure from fluidic media to the sensing mandrel 250. A filling port 270 is provided in the end cap 230 for filling the chamber 223 with the internal fluid, which can be closed after filling with screw 272. (A similar filling port 270 and screw 272 would be used as a vent during the filling procedure).

As before, when deployed in high temperatures, the internal fluid within the chamber 223 of the hydrophone 200 will thermally expand, increasing pressure in the chamber 223 that can damage the diaphragm 240. Accordingly, the disclosed hydrophone 200 includes the pressure compensator or bellows 260 to compensate for this deleterious effect. The bellows 260 is deformable and is constructed such that it will vary in volume in response to increasing pressure of the internal fluid in the chamber 223. In addition to being deformable, the space taken up by the bellows 260 within the chamber 223 reduces the necessary volume of internal fluid required to fill the chamber 223, which in turn reduces the amount of compensation needed. In this regard, the bellows 260 preferably occupies as large a volume as possible within chamber 223. For example, the bellows 260 preferably has a diameter as close as possible to the inner diameter 253 of the sensing mandrel 250 and can have a length equal to the length of the sensing mandrel 250.

The deformable bellows 260 is preferably metal and can constitute one of several types of bellows known in art, including rolled, hydro-formed, welded, chemically deposited, electroplated, and electroformed bellows. Although the bellows 260 can have several forms known in the art, the bellows 260 preferably has a conventional structure defining a plurality of convolutions as shown in FIG. 14. In this way, the bellows 260 is easier to mechanically deform and more likely to return to its original shape after deformation.

Other deformable configurations for the bellows 260 are possible, as one skilled in the art will appreciate, and other materials may be used for the bellows other than metals, such as elastomers, rubber bladders, etc, if suitable for the intended conditions. Other bodies, other than corrugated bellows, may also be used such as hollow or solid, compressible bodies. Moreover, the incorporation of a deformable compensator or bellows can assist in the protection of other sensors other than just hydrophones. For example, in the '903 application, of which this application is a continuation-in-part and which has been incorporated herein by reference, deformable compensators are used to alleviate fluidic pressures for optical fiber accelerometers.

The bellows 260 can be affixed to the end cap 230 by welding, soldering, by high temperature epoxy, by a screw relationship, or by combinations of these techniques. The wall thickness of the bellows 260 is preferably within a range to suit the application in which the hydrophone 200 will be used. Thus, determining an optimal wall thickness will require some degree of experimentation or optimization, as one skilled in the art will appreciate for a given application.

The interior 262 of the bellows 260 preferably, but not necessarily, communicates with the fluidic media being measured by way of a conduit 264 in the housing of the hydrophone 200. In the present embodiment, the conduit 264 is a passageway formed (e.g., drilled) into the end cap 230, which forms an external port 266. To better affix the bellows 260 of FIG. 14 to the end cap 230, it may be preferred that the bellows 260 be formed with an integral tubular member (not shown) that fits within the conduit 264 and that is epoxied, welded, pressed, or screw fit therein. As an alternative to having the conduit 264 formed in the end cap 230, the interior 262 of the bellows 260 can communicate through an independent tube (not shown) in the housing having one end connected to the interior 262 of the bellows 260 and having another end connected to a port (not shown) in the hydrophone 200. As one skilled in the art will appreciate, a number of structures can be used to communicate the interior 262 of the bellows 260 with the fluidic media outside the hydrophone 200. Accordingly, "conduit" is to be understood as an opening, port, hole, channel, tube, pipe, passageway, or other structure though which the fluidic media can be conveyed. During operation, the interior 262 of the bellows 260 may fill with the fluidic media being measured, although this is not deleterious to the operation of the hydrophone 200 as will be explained. If desired, the interior 262 of the bellows 260 may be pre-filled with a fluid or grease before deployment in the well.

The interior 262, by virtue of conduit 264, will reside at substantially the same static pressure as the external fluidic media. Additionally, the elasticity of the bellows 260 will cause this external pressure to be presented to the internal fluid in chamber 223. This effect is beneficial as it tends to normalize the pressure differential experienced across the thin diaphragm 240, which can allow the diaphragm to be made thinner than in the other embodiments described above. Moreover, when high temperatures are encountered and the volume of the internal fluid in the chamber 223 increases, the increased pressure in chamber 223 can be relieved by contraction of the bellows 260.

Proper operation of the hydrophone 200 may not be greatly affected if acoustic pressures in the fluidic media are allowed to transfer through the conduit 264 and bellows 260 to the chamber 223, because the acoustic pressures will be sensed by the mandrel 250 in the chamber 223 regardless of whether the acoustic pressures are transferred through the diaphragm 240 or the conduit 264 and bellows 260. It is preferable, however, that the conduit 264 and its associated port 266 be made small in diameter, such as about 1-mm, to prevent particles or debris from entering the interior 262 of the bellows 260. By making the conduit 264 small enough in diameter, such as from about 0.001 to 0.1 inches, dynamic pressures above a certain frequency, e.g., 3 Hz, may be unable to couple into the interior 262 of the bellows 260. This would not significantly limit the operation of the hydrophone 200 as most acoustic pressures of interest contain frequency components above this frequency cutoff and are preferably transmitted through the diaphragm 240 anyway. Further details concerning the coupling of frequencies through small ports in a hydrophone are disclosed in U.S. patent application Ser. No. 10/393,170, entitled "Pressure Compensated Hydrophone," filed Mar. 20, 2003, which is incorporated herein by reference in its entirety.

The conduit 264 may house a device to prevent clogging of particulates present within the fluidic media. For example, a filter, mesh, screen, or plug 268 can be fitted within the port 266 to prevent particulates from entering the interior 262 of the bellows 260. In one embodiment, a plug 268 can be formed of a porous media, such as sintered metal, and can be fit within the port 266. Such a sintered metal plug 268 is well known in the art and partially restricts the flow of fluid in and out of the bellows 260 while still relieving the pressure created by the internal fluid within the chamber 223.

Under ambient conditions, the chamber 223 of the hydrophone 200 with the sensing mandrel 250 and bellows 260 mounted therein will hold a known amount of internal fluid, such as silicone oil. Knowing the volume of internal fluid, its coefficient of thermal expansion, and the expected hydrostatic pressure of the fluidic media into which the hydrophone is to be deployed, the pressure exerted by the internal fluid within the chamber 223 can be estimated, which provides the hydrophone designer some indication of the how resilient the bellows 260 must be for a given operational environment. Knowledge of the modulus of elasticity of the material used for the bellows 260, and modeling thereof, will also assist in determining whether a compensator or bellows of a particular geometry and thickness will suitably deform and hence reduce the pressure within the chamber 223 due to thermal expansion of the internal fluid (e.g., silicone oil) contained therein.

While preferred to couple the interior 262 of the bellows 260 to the external fluidic media being measured, pressure compensation can be achieved even if the interior is not so coupled. For example, the bellows 260 can constitute a similar structure, such as an enclosed rubber or metallic bladder, which is suitably compressible to relieve additional pressure effected by the thermal expansion of the internal fluid.

IV. Fourth Hydrophone Embodiment Using a Buffer Tube

Figure 15:
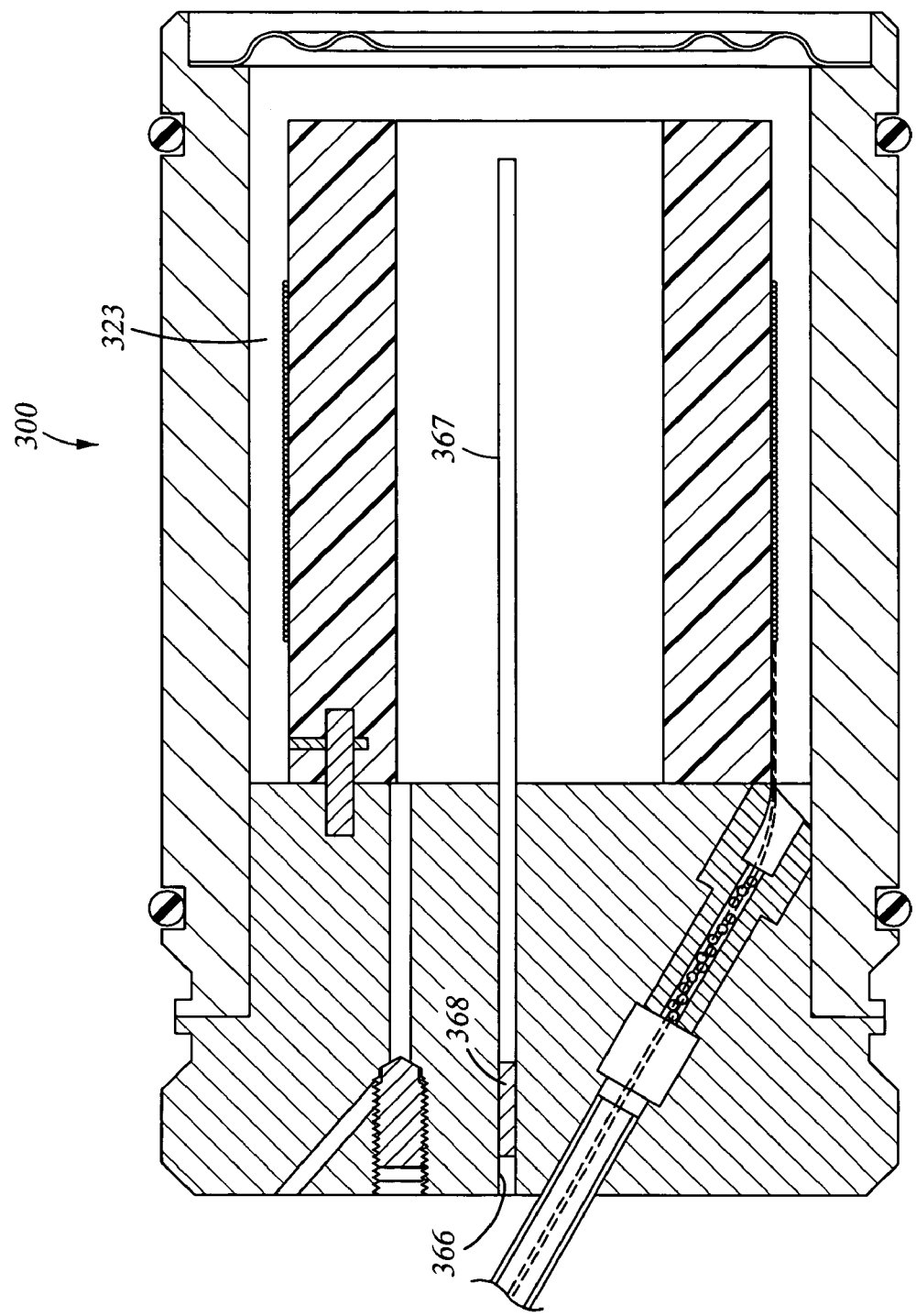
FIG. 15 illustrates a fourth embodiment of a hydrophone having a buffer tube.

FIG. 15 illustrates an alternative pressure compensation method for use with a hydrophone 300 that uses a long tube or a buffer tube 367 to transmit non-acoustic pressure from outside the hydrophone 300 to inside the hydrophone. The buffer tube couples to a passage or a port 366 of the hydrophone 300. A filter, mesh, screen, or plug 368 can be fitted within the port 366 to prevent particulates from entering the buffer tube 367. Since the buffer tube 367 is long and has a very small bore, it is an acoustic filter. Strong changes in the pressure outside of the hydrophone housing are balanced within the housing without passing the acoustic pressure signal. In this manner, the bellows of FIG. 14 may not be required. For a given fluid and a predetermined diameter of the buffer tube 367, a sufficient capillary force is provided to preclude fluid flow between the inside and outside of the hydrophone below some minimum pressure threshold. Thus, contaminating and potentially caustic fluids from the well bore are never communicated to the internal oil filling fluid of the hydrophone 300 because of the extended length of the buffer tube 367 and the fact that the buffer tube is filled with the same fluid as the inside of the hydrophone cavity 323. The buffer tube 367 is compatible with the other configurations of the hydrophones disclosed herein. As shown, the buffer tube 367 is substantially straight. However, the buffer tube 367 may be required to be quite long and may be curved or sinuous in shape (e.g. where the internal fluid has a relatively low viscosity). The use of buffer tubes to communicate pressure in sensing schemes is known in the art and is described in commonly owned U.S. patent application Ser. No. 6,439,055, titled "Pressure Sensor Assembly Structure to Insulate a Pressure Sensing Device from Harsh Environments," to Maron et al, the disclosure of which is incorporated herein by reference to the extent necessary to allow one skilled in the art to appreciate the present invention.

VI. Conclusion

A number of embodiments for acoustic sensors, e.g. hydrophones, have been provided in the present disclosure. It will be appreciated that one or more aspects of a particular embodiment can be applied to other embodiments.

In one example, the routing and organizing optical fiber disclosed in the embodiment of FIGS. 5-13B can be applied to the embodiments of FIGS. 1-4, 15 and to some extent to the embodiment of FIG. 14. For the embodiment of FIG. 14, for example, modifications can be made to accommodate routing of optical fiber around the outside of the mandrel 250, or the bellows 262 can be shaped and oriented such that it would not interfere with routing of optical fiber within the bore 252 of the mandrel 250. In another example, disclosed aspects for mounting the sensing mandrel in a "suspended" fashion, disclosed in the embodiment of FIGS. 5-13B, can be applied to the embodiments of FIGS. 1-4 and FIGS. 14-15.

Additionally, techniques disclosed for dealing with the issue of thermally expanding internal fluids (e.g., taking up space with structures such as filler member 60 of FIG. 2, and/or the use of a bellows 260 as in FIG. 14), can be combined with minimal engineering complexity. In one example, the bellows 260 can be made with a closed passage through its center. When placed inside of the sensing mandrel, such a closed passage through the bellows can allow the ingress and egress fibers to be routed through bellows. An illustration of this would be to replace the filler member 62 in FIGS. 2-3 with a similarly shaped bellows, i.e., one resembling a doughnut in cross-section. In another example, the hydrophone 100 of FIGS. 6A-B can have a deformable bellows positioned in the channel 180 of the axle 174. In this modification, a conduit could connect the interior of the bellows to the outside of the hydrophone 100 if desired. The bellows could be formed with a slot parallel to the axis of the mandrel to allow routing and protection of the ingress and egress leads 91, 93. In another example, the hydrophone 100 in FIGS. 6A and 6B could simply be made longer, i.e., with a space between the diaphragm 140 and the end disk 176, to accommodate a bellows, which could be attached to the inner diameter 122 of the front housing 120. In yet another example, a bellows could be mounted in the excess volume in the back housing 130 at the recess 135 of the hydrophone 100 and could communicate with the chamber 123 through an additional port formed in the back housing 130. These and other modifications to and combinations of the aspects of the disclosed embodiments are achievable by those skilled in the art.

An alternative design mandrel and fiber wiring technique for use in the present invention is described in commonly owned application filed concurrently with this application and having Attorney Docket Number WEAT/0537 and entitled "Hydrophone Mandrel For Precise Placement Of Gratings," hereby incorporated in its entirety.

While specifically disclosed as being of benefit to hydrophone, many of the advents disclosed herein have applicability to other sensors, including optical sensors. For example, the various pressure relieving schemes, or schemes for organizing the optical fibers, could have applicability to devices which are not hydrophones, or are not designed for the specific purpose of detecting pressures.

A "sensor" is said to be located where its sensitive portion is located. Therefore, in the context of the present disclosure, the fiber optic wraps whose length is modulated to detect an event of interest, such as the wraps of the hydrophones, are located in its respective housings. Thus, these "sensors" can be said to be "located" or "contained" within those housings, even though the Bragg gratings that bound them are located within a splice component. By contrast, if the Bragg gratings themselves are used as the sensitive portions, for example, if one or more Bragg gratings are wrapped around the sensing mandrel to detect acoustic phenomena by assessing Bragg reflection wavelength shifts, then such a sensor will be understood to be "located" or "contained" in the housing for the fiber Bragg grating.

While the foregoing is directed to embodiments of the present invention, other and further embodiments of the invention may be devised without departing from the basic scope thereof, and the scope thereof is determined by the claims that follow.

The invention claimed is:

1. An apparatus for sensing acoustic pressures in a fluidic media, comprising:
  a housing enclosing a liquid; and
  a mandrel, wherein the mandrel contains at least one feature for routing an optical fiber, wherein the feature comprises at least one pre-defined tunnel from one end of the mandrel to another end for routing the optical fiber; and
  an optical fiber sensor wherein the fiber is routed through the pre-defined tunnel of the mandrel and is then wrapped around the outside of the mandrel, the sensor and mandrel being within the liquid for sensing the acoustic pressures in the fluidic media.

2. The apparatus of claim 1, wherein the feature comprises at least one groove for routing the optical fiber.

3. The apparatus of claim 2, wherein the at least one groove comprises a helical groove on an outer surface of the mandrel.

4. The apparatus of claim 2, wherein the at least one groove comprises a spiral groove on an end of the mandrel.

5. The apparatus of claim 1, wherein the feature comprises at least one tunnel from one end of the mandrel to another end for routing at least one portion of the optical fiber having a grating therein.

6. The apparatus of claim 1, wherein the feature comprises a bore through the center of the mandrel.

* * * * *